US006986398B2

(12) United States Patent
Obayashi

(10) Patent No.: US 6,986,398 B2
(45) Date of Patent: Jan. 17, 2006

(54) VEHICULAR POWER SUPPLY APPARATUS AND ENGINE-DRIVE-REGULATION SUPPORTING APPARATUS

(75) Inventor: Kazuyoshi Obayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/602,726

(22) Filed: Jun. 25, 2003

(65) Prior Publication Data

US 2004/0084232 A1    May 6, 2004

Related U.S. Application Data

(62) Division of application No. 10/003,081, filed on Dec. 6, 2001, now Pat. No. 6,624,529.

(30) Foreign Application Priority Data

Dec. 28, 2000   (JP)   ............................. 2000-402724

(51) Int. Cl.
    *B60K 1/00* (2006.01)
(52) U.S. Cl. ................. 180/65.2; 180/167; 701/93
(58) Field of Classification Search ............... 180/167, 180/168, 170, 65.2; 701/91, 93, 207, 213
    See application file for complete search history.

(56) References Cited

U.S. PATENT DOCUMENTS

| 3,868,559 A | 2/1975 | Hill et al. |
| 4,323,830 A | 4/1982 | Belsterling et al. |
| 4,661,760 A | 4/1987 | Goto et al. |
| 5,459,357 A | 10/1995 | Minks |
| 5,485,161 A * | 1/1996 | Vaughn ................. 342/357.13 |
| 5,550,445 A | 8/1996 | Nii |
| 5,563,802 A | 10/1996 | Plahn et al. |
| 5,614,809 A | 3/1997 | Kiuchi et al. |
| 5,691,576 A | 11/1997 | Minks |
| 5,966,000 A | 10/1999 | Yang |
| 6,094,618 A * | 7/2000 | Harada ....................... 701/207 |
| 6,112,151 A * | 8/2000 | Kruse ......................... 701/115 |
| 6,151,549 A * | 11/2000 | Andrews et al. ............ 701/115 |
| 6,161,072 A * | 12/2000 | Clapper ....................... 701/93 |
| 6,356,833 B2 * | 3/2002 | Jeon ............................ 701/93 |
| 6,420,936 B1 | 7/2002 | Nishiyama |
| 6,633,811 B1 * | 10/2003 | Aumayer .................... 701/207 |

FOREIGN PATENT DOCUMENTS

| EP | 0325205 A2 | 7/1989 |
| EP | 0 884 819 A2 | 12/1998 |
| FR | 2594273 A1 | 8/1987 |

(Continued)

*Primary Examiner*—Christopher P. Ellis
*Assistant Examiner*—Brian Swenson
(74) *Attorney, Agent, or Firm*—Oliff & Berridge, PLC

(57) ABSTRACT

A power feed portion includes a power storage portion and a power generating portion. The power storage portion includes a storage battery. The power feed portion feeds electric power to a plurality of on-vehicle loads. In cases where the sum of feedable electric power is smaller than the sum of required electric power or in cases where an electric quantity related to the sum of feedable electric power is smaller than an electric quantity related to the sum of required electric power, a control portion increases the sum of feedable electric power or decreases the sum of required electric power. The sum of feedable electric power is equal to electric power which can be fed from the power feed portion to the on-vehicle loads, and which contains electric power generated by the power generating portion and electric power feedable from the storage battery.

2 Claims, 12 Drawing Sheets

FOREIGN PATENT DOCUMENTS

| | | |
|---|---|---|
| JP | A 61-280717 | 12/1986 |
| JP | A 08-289406 | 11/1996 |
| JP | A 09-209790 | 8/1997 |
| JP | A 10-075477 | 3/1998 |
| JP | A 11-318002 | 11/1999 |
| JP | A 2000-16199 | 1/2000 |
| JP | A 200-188802 | 7/2000 |
| WO | WO 92/14631 | 9/1992 |

* cited by examiner

| LOAD \ EVALUATION | RANGE | FUNCTION | EFFECT | | SPECIAL CONTROL | PRIORITY POINT |
|---|---|---|---|---|---|---|
| A | 1.0 | 1.0 | 0.8 | | 1.0 | 0.75 |
| B | 0.8 | 0.6 | 0.9 | | 1.0 | 0.35 |
| C | 0.8 | 0.3 | 0.9 | | $\overset{x}{(0.7-1.0)}$ | 0.14−0.2 |
| D | 0.6 | 0.8 | 0.9 | | 1.0 | 1.0 |
| E | 0.4 | 0.9 | 0.8 | | $\overset{y}{(0.5-1.0)}$ | 0.12−0.24 |
| F | 0.7 | 0.7 | 0.7 | | 1.0 | 0.3 |

VEHICULAR POWER SUPPLY APPARATUS AND ENGINE-DRIVE-REGULATION SUPPORTING APPARATUS

This is a Division of application Ser. No. 10/003,081 filed Dec. 6, 2001, now U.S. Pat. No. 6,624,529 which in claims the benefit of priority of Japanese Patent Application 2000-402724 filed Dec. 28, 2000. The entire disclosure of the prior application is hereby incorporated by reference herein in its entirety.

BACKGROUND OF THE INVENTION

1. Field of the Invention

This invention relates to a vehicular power supply apparatus including an electric generator/motor or a fuel cell. In addition, this invention relates to an engine-drive-regulation supporting apparatus.

2. Description of the Related Art

A typical automotive vehicle driven by an internal combustion engine includes a power supply apparatus in which a battery can be charged by an alternator. Generally, the rate of the power generation by the alternator is adjusted to regulate the battery voltage at a desired level.

A typical automotive vehicle with a hybrid drive includes an electric generator/motor which can be operated in either a generator mode or a motor mode. The electric generator/motor is coupled with an engine. The hybrid-drive vehicle generally includes a power supply apparatus in which a battery can be charged by the electric generator/motor. When the vehicle is decelerated, the battery is charged by the electric generator/motor so that energy can be recovered. When the vehicle is accelerated, the battery is discharged to activate the electric generator/motor to assist the vehicle acceleration. Usually, the rate of the power generation by the electric generator/motor is adjusted to control the charge state of the battery at a target. The control of the battery charge state is to optimize the charging and discharging of the battery during the recovery of vehicle-deceleration energy and during assistance to vehicle acceleration.

A battery designed to provide an appreciable portion of power to drive a vehicle tends be large in size and heavy in weight.

Japanese patent application publication number P2000-16199A discloses a power feed apparatus for a vehicle. The power feed apparatus includes a wire harness connecting a battery and loads. The wire harness has first and second conductive members. A first comparator monitors the potential at the first conductive member. The first comparator detects when the first conductive member short-circuits to a ground. A processor connected to the first comparator activates a warning lamp when the first comparator detects short circuit of the first conductive member to the ground. A second comparator monitors the potential at the second conductive member. The second comparator detects when the second conductive member short-circuits to the ground. The processor is connected with the second comparator. The processor opens a relay switch and thereby disconnects the battery from the loads when the second comparator detects short circuit of the second conductive member to the ground.

SUMMARY OF THE INVENTION

It is a first object of this invention to provide a vehicular power supply apparatus which is relatively small in size and relatively light in weight.

It is a second object of this invention to provide a new and good engine-drive-regulation supporting apparatus.

A first aspect of this invention provides a power supply apparatus for a vehicle. The apparatus comprises a power feed portion including a power storage portion and a power generating portion, the power storage portion including a storage battery, the power storage portion and the power generating portion transmitting and receiving electric power to and from each other, the power feed portion feeding electric power to a plurality of on-vehicle loads; and a control portion for controlling the electric power fed from the power feed portion to the on-vehicle loads; wherein the control portion includes means for, in cases where the sum of feedable electric power is smaller than the sum of required electric power or in cases where an electric quantity related to the sum of feedable electric power is smaller than an electric quantity related to the sum of required electric power, increasing the sum of feedable electric power or decreasing the sum of required electric power, wherein the sum of feedable electric power is equal to electric power which can be fed from the power feed portion to the on-vehicle loads, and which contains electric power generated by the power generating portion and electric power feedable from the storage battery, and wherein the sum of required electric power is equal to the sum of electric power consumed by the on-vehicle loads.

A second aspect of this invention provides a power supply apparatus for a vehicle. The apparatus comprises a power feed portion including a power storage portion and a power generating portion, the power storage portion including a storage battery, the power storage portion and the power generating portion transmitting and receiving electric power to and from each other, the power feed portion feeding electric power to a plurality of on-vehicle loads; and a control portion for controlling the electric power fed from the power feed portion to the on-vehicle loads; wherein the control portion includes means for, in cases where the sum of required electric power exhibits a variation, detecting the variation in the sum of required electric power on the basis of drive conditions of the on-vehicle loads or conditions of currents, means for changing electric power generated by the power generating portion in response to the detected variation, and means for, in cases where an increase in the sum of required electric power can not be met by an increase in the electric power generated by the power generating portion, discharging the storage battery to compensate for the difference therebetween, and wherein the sum of required electric power is equal to the sum of electric power consumed by all of electrically-powered loads including the on-vehicle loads.

A third aspect of this invention provides an engine-drive-regulation supporting apparatus mounted on a vehicle driven by an engine. The apparatus comprises engine-drive-regulated region detecting means including at least one of means for judging whether or not the position of the vehicle is in a prescribed engine-drive-regulated region on the basis of information received from a vehicle position detecting device provided on the vehicle or from an external with respect to the vehicle, and means for receiving an engine-drive-regulation signal from an external with respect to the vehicle; and engine-drive regulating means for giving a notice to a vehicle driver, suspending the engine, or decelerating the engine when it is judged that the position of the vehicle is in the prescribed engine-drive-regulated region or in response to reception of the engine-drive-regulation signal.

DETAILED DESCRIPTION OF THE INVENTION

Basic Embodiments

Figure 1:
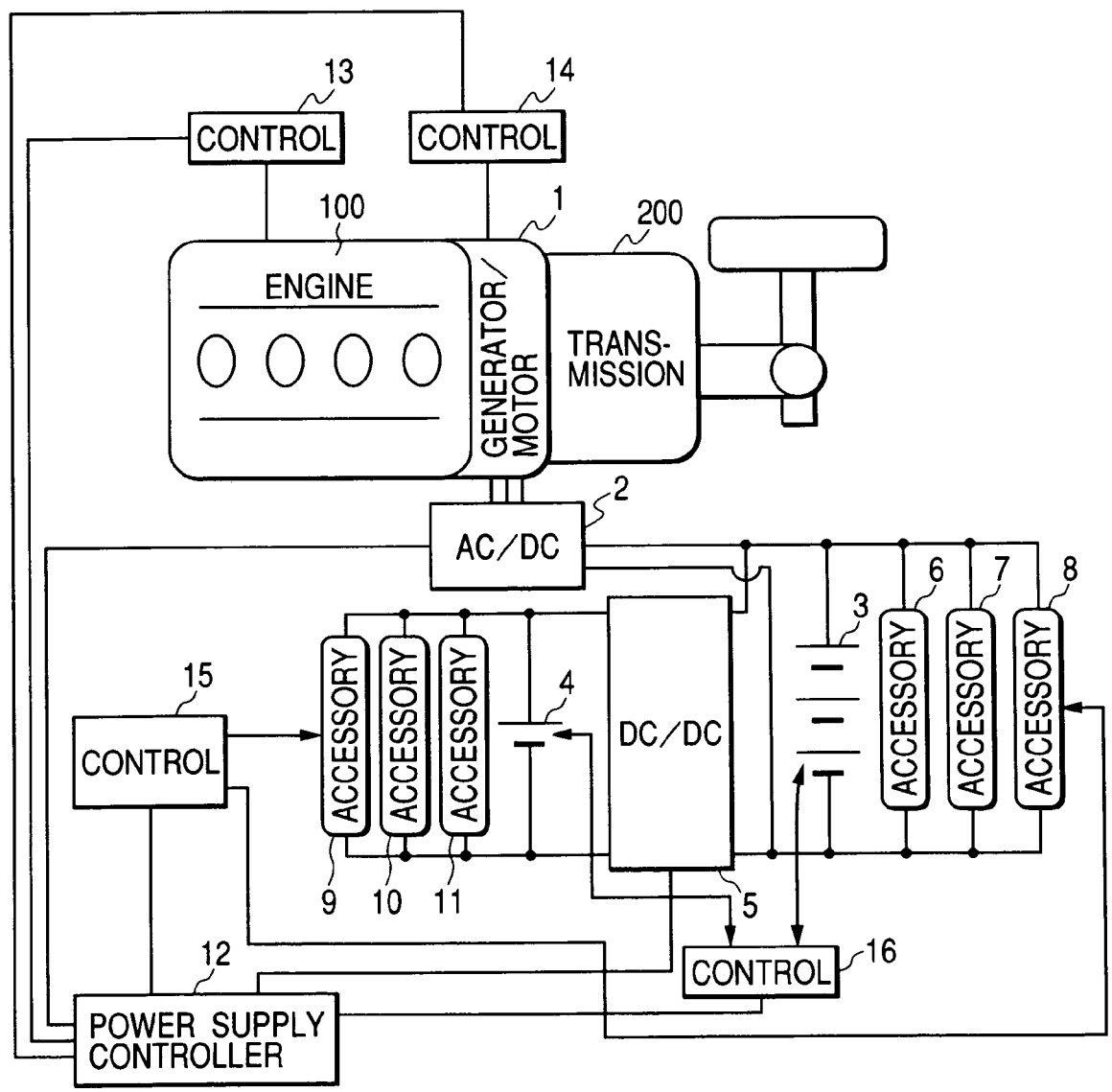
FIG. 1 is a diagram of a power supply apparatus according to a first specific embodiment of this invention.

According to a first basic embodiment of this invention, a power supply apparatus for a vehicle comprises a power feed portion including a power storage portion and a power generating portion. The power storage portion includes a storage battery. The power storage portion and the power generating portion transmit and receive electric power to and from each other. The power feed portion feeds electric power to a plurality of on-vehicle loads. A control portion operates for controlling the electric power fed from the power feed portion to the on-vehicle loads. The control portion includes means for, in cases where the sum of feedable electric power is smaller than the sum of required electric power or in cases where an electric quantity related to the sum of feedable electric power is smaller than an electric quantity related to the sum of required electric power, increasing the sum of feedable electric power or decreasing the sum of required electric power. The sum of feedable electric power is equal to electric power which can be fed from the power feed portion to the on-vehicle loads, and which contains electric power generated by the power generating portion and electric power feedable from the storage battery. The sum of required electric power is equal to the sum of electric power consumed by the on-vehicle loads.

The sum of feedable electric power may contain maximum electric power discharged from the storage battery. Preferably, the sum of feedable electric power is set on the basis of a suitable level of power discharged from the storage battery. The power generating portion may include an electric generator/motor coupled with an engine. The power generating portion may further include a fuel cell.

The feedable electric power is increased or the required electric power is decreased in order that the sum of feedable electric power can exceed the sum of electric power required by the on-vehicle loads.

Thereby, the power storage portion and the power generating portion can be relatively small in size. It is possible to suitably feed electric power to the on-vehicle loads while operating the power feed portion in an allowable range. In addition, it is possible to prevent the occurrence of a shortage of electric power. Furthermore, it is possible to prevent the storage battery from being deteriorated by the shortage of electric power.

The generated electric power is increased as an increase in the sum of fed electric power by using the fact that a non-accumulation result increase in the sum of required electric power exceeds the present sum of feedable electric power or the sum of feedable electric power at a suitable level. Therefore, the upper limit of electric power fed to loads rises to the sum of battery allowable power and generated electric power. Thus, there is a surplus in the ability to feed electric power. It is possible to more quickly deal with an increase in the sum of required electric power. A variation in the amount of electric power remaining in the storage battery is relatively small. The number of times of charging and discharging of the storage battery is relatively small. As a result, the life of the storage battery is relatively long. A feature is paying attention to the instantaneous electric power W in addition to the electric power amount Wh.

In the case where a large-sized on-vehicle load is suddenly activated, when the sum of required electric power exceeds the sum of feedable electric power (for example, the sum of currently-generated electric power and maximum or suitable electric power discharged from the storage battery), the generated electric power is promptly increased by a rate corresponding to the difference therebetween. Accordingly, even when the large-sized on-vehicle load is suddenly activated, the amount of electric power remaining in the storage battery can be prevented from significantly dropping.

Preferably, both increasing the generated electric power and decreasing the required electric power are implemented so that the sum of feedable electric power can surely exceed the sum of required electric power. In the case where the sum of electric power required by the on-vehicle loads becomes greater than the sum of feedable electric power, the power feed to ones of the on-vehicle loads is reduced or cut off. Therefore, the amount of electric power remaining in the storage battery can be prevented from significantly dropping. Thus, the power supply apparatus operates better.

A second basic embodiment of this invention is a modification of the first basic embodiment thereof. In a power supply apparatus of the second basic embodiment of this invention, the control portion includes means for, in cases where the discharge electric power of the storage battery exceeds a prescribed allowable maximum value or a prescribed reference value, increasing the generated electric power or decreasing the sum of required electric power.

An increase in the sum of required electric power is detected by an increase in electric power discharged from the storage battery, and the sum of feedable electric power is increased or the sum of required electric power is decreased in response to the detection result. It is possible to easily and accurately detect an increase in the sum of required electric power.

A third basic embodiment of this invention is a modification of the first basic embodiment thereof. In a power supply apparatus of the third basic embodiment of this invention, the control portion includes means for, in cases where it is judged that the sum of feedable electric power or a near-future prediction value thereof exceeds the sum of required electric power or a near-future prediction value thereof, increasing the sum of feedable electric power or decreasing the sum of required electric power.

Calculation is given about an increase in the present value of electric power consumed by the on-vehicle loads or the near-future prediction value thereof rather than the state of the storage battery, and the sum of feedable electric power or the amount of generated electric power is increased in response to the calculation result.

There are advantages similar to those provided by the first or second basic embodiment of this invention. The generated electric power is increased on the basis of the prediction of an increase in the electric power consumed by the on-vehicle loads. Thereby, improved control response performances are attained. In the case where a command to drive a prescribed on-vehicle load occurs or in the case where it is predicted that a command will occur in near future, the sum of feedable electric power or the generated electric power is increased in advance. Thereby, the storage battery can be prevented from being excessively discharged (over-discharged) and a power supply voltage can be prevented from dropping as a result of a delay of an increase in the generated electric power.

A fourth basic embodiment of this invention is a modification of the third basic embodiment thereof. In a power supply apparatus of the fourth basic embodiment of this invention, the control portion includes means for calculating the sum of required electric power or the near-future prediction value thereof on the basis of detected operating conditions of the vehicle or conditions of drive of the on-vehicle loads.

The drive of an on-vehicle load can be predicted from a vehicle operating condition or a condition of the drive of the on-vehicle load. A near-future increase in the sum of required electric power is predicted from a vehicle operating condition or a condition of the drive of an on-vehicle load. In the case where the engine is suspended by an idle stop procedure, restart of the engine which will occur thereafter can be predicted. In the case of periodically intermittent drive of an on-vehicle load, an increase in the sum of required electric power can predicted more accurately.

A fifth basic embodiment of this invention is a modification of one of the first to fourth basic embodiments thereof. In a power supply apparatus of the fifth basic embodiment of this invention, the control portion includes means for increasing the sum of feedable electric power by increasing the electric power generated by the power generating portion.

Since increasing the sum of feedable electric power is executed by increasing the generated electric power, the above-mentioned advantages can be provided more surely for a longer time.

A sixth basic embodiment of this invention is a modification of the fifth basic embodiment thereof. In a power supply apparatus of the sixth basic embodiment of this invention, the control portion includes means for giving preference to increasing the electric power generated by the power generating portion over decreasing the sum of required electric power.

Turning off an on-vehicle load or a reduction in the drive rate thereof is prevented from causing inconvenience while the above-mentioned advantages are provided.

A seventh basic embodiment of this invention is a modification of one of the first to sixth basic embodiments thereof. In a power supply apparatus of the seventh basic embodiment of this invention, the control portion includes means for decreasing the sum of required electric power by suspending prescribed ones of the on-vehicle loads, reducing drive rates of the prescribed ones of the on-vehicle loads, or implementing change from continuous power feed to the prescribed ones of the on-vehicle loads to intermittent power feed thereto on a temporally offset basis.

The sum of required electric power can be decreased. Although the drive rate of an on-vehicle load is reduced, operation thereof is maintained. Thus, inconvenience is prevented from being caused by stop of the on-vehicle load. Although an on-vehicle load is intermittently driven, operation thereof is maintained. Therefore, inconvenience is prevented from being caused by stop of the on-vehicle load.

An eighth basic embodiment of this invention is a modification of one of the first to seventh basic embodiments thereof. In a power supply apparatus of the eighth basic embodiment of this invention, the control portion includes means for, in cases where the sum of feedable electric power exceeds the sum of required electric power, decreasing the electric power generated by the power generating portion or recovering the sum of required electric power so as to converge charge and discharge electric power of the storage battery on zero while the amount of electric power remaining in the storage battery is in a prescribed range.

It is possible to decrease the generated electric power which has been increased in accordance with an increase in the sum of required electric power. Furthermore, it is possible to recover or increase the sum of required electric power which has been decreased.

When the sum of feedable electric power reaches the sum of required electric power as a result of an increase in the sum of required electric power, the power generation is maintained so that the amount of electric power remaining in the storage battery can return into the prescribed range. Finally, the charge and discharge electric power of the storage battery is converged on zero. Thus, when the sum of feedable electric power reaches the sum of required electric power, the generated electric power is adjusted so that the charge and discharge electric power in the sum of feedable electric power can be zero.

Thereby, the amount of electric power remaining in the storage battery which has been temporarily varied in accordance with a variation in the sum of required electric power can be quickly returned to a fixed level.

A ninth basic embodiment of this invention is a modification of the eighth basic embodiment thereof. In a power supply apparatus of the ninth basic embodiment of this invention, the control portion includes means for giving preference to recovering the sum of required electric power over decreasing the electric power generated by the power generating portion.

It is possible to remove inconvenience caused by the decrease in the electric power consumed by the on-vehicle loads.

A tenth basic embodiment of this invention is a modification of one of the first to ninth basic embodiments thereof. According to the tenth basic embodiment of this invention, the power storage portion includes a first storage battery for feeding electric power to a first on-vehicle load group, a second storage battery for feeding electric power to a second on-vehicle load group, and a DC-DC power converting portion for transmitting interchange electric power between the first and second storage batteries. The control portion includes means for adjusting electric power required by the first and second on-vehicle load groups, the electric power generated by the power generating portion, or the interchange electric power transmitted between the first and second storage batteries so that the sum of feedable electric power for the first on-vehicle load group will exceed the sum of required electric power on the first on-vehicle load group, and that the sum of feedable electric power for the second on-vehicle load group will exceed the sum of required electric power on the second on-vehicle load group.

The power supply apparatus includes a high-voltage battery for feeding electric power to high-voltage-driven loads, and a low-voltage battery for feeding electric power to low-voltage-driven loads. It is possible to surely feed electric power to both a group of the high-voltage-driven loads and a group of the low-voltage-driven loads.

For each of storage battery systems, the generated electric power is increased and decreased, or the required electric power is increased and decreased, or the interchange electric power is increased and decreased so that the sum of feedable electric power will exceed the sum of electric power required by the on-vehicle loads. The sum of feedable electric power is equal to the sum of the electric power generated by the power generating portion, the electric power which can be discharged from the power storage portion toward the on-vehicle loads, and the interchange electric power. Thereby, it is possible to properly feed electric power to the on-vehicle loads while two storage batteries and the power generating portion are operated in allowable ranges.

Preferably, for each of the storage battery systems, all the generated electric power, the required electric power, and the interchange electric power are adjusted so that the sum of feedable electric power toward the on-vehicle loads will exceed the sum of required electric power. Thereby, in the case where the sum of electric power required by the on-vehicle loads is greater than the sum of feedable electric power, the power feed to ones of the on-vehicle loads is reduced or cut off so that operation of a power supply system can be maintained without any problem.

An eleventh basic embodiment of this invention is a modification of the tenth basic embodiment thereof. In a power supply apparatus of the eleventh basic embodiment of this invention, the control portion includes means for giving preference to adjusting the electric power generated by the power generating portion over adjusting the interchange electric power.

It is possible to omit a step of recovering the amount of electric power remaining in the storage battery in a power feed side after the execution of the interchange of electric power.

A twelfth basic embodiment of this invention is a modification of one of the first to ninth basic embodiments thereof. According to the twelfth basic embodiment of this invention, the power storage portion includes a first storage battery for feeding electric power to a first on-vehicle load group, and a second storage battery for feeding electric power to a second on-vehicle load group. The power generating portion includes a first AC-DC power converting portion for transmitting and receiving electric power to and from the first storage battery, and a second AC-DC power converting portion for transmitting and receiving electric power to and from the second storage battery. The control portion includes means for adjusting electric power required by the first and second on-vehicle load groups or electric power generated by the first and second AC-DC power converting portions so that the sum of feedable electric power for the first on-vehicle load group will exceed the sum of required electric power on the first on-vehicle load group, and that the sum of feedable electric power for the second on-vehicle load group will exceed the sum of required electric power on the second on-vehicle load group.

The power supply apparatus includes a high-voltage battery for feeding electric power to high-voltage-driven loads, and a low-voltage battery for feeding electric power to low-voltage-driven loads. It is possible to surely feed electric power to both a group of the high-voltage-driven loads and a group of the low-voltage-driven loads.

For each of storage battery systems, the generated electric power is increased and decreased or the required electric power is increased and decreased so that the sum of feedable electric power toward the on-vehicle loads will exceed the sum of required electric power. Thereby, it is possible to properly feed electric power to the on-vehicle loads while two storage batteries and the power generating portion are operated in allowable ranges.

Preferably, for each of the storage battery systems, the generated electric power and also the required electric power are adjusted so that the sum of feedable electric power toward the on-vehicle loads will exceed the sum of required electric power. Thereby, in the case where the sum of electric power required by the on-vehicle loads is greater than the sum of feedable electric power, the power feed to ones of the on-vehicle loads is reduced or cut off so that operation of a power supply system can be maintained without any problem.

A thirteenth basic embodiment of this invention is a modification of one of the first to twelfth basic embodiments thereof. According to the thirteenth basic embodiment of this invention, the control portion includes means for, in cases where a command to change the sum of required electric power is given and then the resultant sum of required electric power is equal to or greater than the sum of feedable electric power, permitting the execution of the command to change the sum of required electric power at or after the moment of instructing an increase in the sum of feedable electric power or a decrease in the sum of required electric power so that the sum of feedable electric power can exceed the resultant sum of required electric power.

With respect to a command to drive an on-vehicle load so that the sum of required electric power will exceed the sum of feedable electric power, the drive of the on-vehicle load is delayed until the sum of feedable electric power can follow it. Thus, a drawback is removed which occurs in the case where the on-vehicle load is driven although the sum of feedable electric power is insufficient.

A fourteenth basic embodiment of this invention is a modification of the thirteenth basic embodiment thereof. In a power supply apparatus of the fourteenth basic embodiment of this invention, the control portion includes means for, regarding ones of the on-vehicle loads which can be driven at drive rates in prescribed ranges, driving the ones of the on-vehicle loads at the drive rates in the prescribed ranges when a command to drive the ones of the on-vehicle loads is given.

In the case where the sum of feedable electric power is insufficient, an on-vehicle load to be newly driven is driven at a reduced rate. Thus, a drawback which might be caused by the suspension of an on-vehicle load is prevented from occurring in the case where all the on-vehicle loads can not be driven at rating powers.

A fifteenth basic embodiment of this invention is a modification of one of the first to fourteenth basic embodiments thereof. According to the fifteenth basic embodiment of this invention, the power generating portion includes an electric generator/motor driven by an engine. The control portion includes means for enabling the power storage portion to maintain a discharge power quantity allowing the engine to start during a time interval except a first time period immediately after a given number of times of engine-start discharging of the power storage portion and a second time period for which the engine is starting.

The on-vehicle loads are fed with electric power in response to an increase in the sum of required electric power so that the sum of feedable electric power will exceed the sum of required electric power. At this time, a portion of the sum of feedable electric power is given by the discharging of the power storage portion. Therefore, the amount of electric power remaining in the storage battery drops. In the case where the power generating portion includes an electric generator/motor driven by the engine, the electric generator/motor is required to implement start of the engine. The storage battery always stores the amount of electric power which enables engine starting action to be repetitively performed a given number of times (only once or a plurality of times). During the time interval for which the engine is starting or during the time interval immediately after the completion of the start of the engine, the storage battery has been discharged for the start of the engine and the amount of electric power remaining in the storage battery is permitted to drop below a desired level. Thereby, the previously-mentioned advantages are provided while the engine start is implemented and the previously-mentioned control is executed.

A sixteenth basic embodiment of this invention is a modification of one of the first to fifteenth basic embodiments thereof. According to the sixteenth basic embodiment of this invention, the power generating portion includes an electric generator/motor driven by an engine. The control portion includes means for, in cases where suspension of the engine during a prescribed short time interval is predicted, storing a prescribed portion of a discharge power quantity in the power storage portion before the engine is suspended.

In the case where the engine is frequently suspended by an idle stop procedure or in the case where a radiator fan is periodically activated, engine start or radiator fan operation can be predicted. Provided that all or a portion of an estimated electric power amount consumed by near-future drive of an on-vehicle load is stored in the storage battery in advance, the amount of electric power remaining in the storage battery is prevented from excessively dropping thereafter. Preferably, one-third to a half of an electric power amount used for the drive of the on-vehicle load is stored in the storage battery in advance.

A seventeenth basic embodiment of this invention is a modification of the seventh basic embodiment thereof. In a power supply apparatus of the seventeenth basic embodiment of this invention, the control portion includes means for suspending the prescribed ones of the on-vehicle loads or reducing the drive rates of the prescribed ones of the on-vehicle loads to decrease the sum of required electric power in an order opposite an importance-based order predetermined in accordance with the degrees of importance of the on-vehicle loads.

The decrease in the sum of required electric power is executed in the order opposite the predetermined importance-based order. Thus, an important on-vehicle load is prevented from being suspended or the drive rate thereof is prevented from being reduced while inconvenience is minimized.

The on-vehicle loads have different degrees of importance according to operating conditions of the vehicle (also referred to as on-vehicle load use conditions). In the case where the sum of feedable electric power, a prediction value thereof, the electric power discharged by the storage battery, a prediction value thereof, the discharge electric power amount, or a prediction value thereof is relatively insufficient, the on-vehicle loads are suspended or the drive rates thereof are reduced in the order of importance degree from the lowest toward the highest. Thereby, the storage battery can be relatively small in size. The ability of the power generating portion to generate electric power can be relatively low. A drawback can be prevented from being caused by over-discharging of the storage battery or a power supply voltage drop.

The reduction in the drive rate of an on-vehicle load may be implemented by duty ratio modulation in PWM operation. An average drive rate may be reduced by performing intermittent drive of an on-vehicle load at a fixed long period. Preferably, the timings of intermittent drive of on-vehicle loads are offset so that the on-vehicle loads will not be simultaneously activated.

An eighteenth basic embodiment of this invention is a modification of the seventeenth basic embodiment thereof. In a power supply apparatus of the eighteenth basic embodiment of this invention, the control portion includes means for altering the importance-based order by a change pattern predetermined on the basis of detected vehicle operating conditions or drive conditions of the on-vehicle loads.

Data representing a plurality of importance degree orders are previously stored. One can be selected from the importance degree orders on the basis of operating conditions of the vehicle or conditions of the drive of the on-vehicle loads. Therefore, the on-vehicle loads can be suspended or the drive rates thereof can be reduced in an optimal order with respect to a variation in the operating conditions of the vehicle or the conditions of the drive of the on-vehicle loads.

A nineteenth basic embodiment of this invention is a modification of one of the first to eighteenth basic embodiments thereof. In a power supply apparatus of the nineteenth basic embodiment of this invention, the control portion includes means for, in cases where the electric power generated by the power generating portion is greater than the sum of required electric power by a prescribed value or more, decreasing the electric power generated by the power generating portion or increasing the sum of required electric power.

An excess of the sum of feedable electric power with respect to the sum of required electric power can be easily and surely detected from the generated electric power and the sum of required electric power. The amount of electric power remaining in the storage battery is prevented from undesirably increasing by decreasing the generated electric power or increasing the required electric power.

A twentieth basic embodiment of this invention is a modification of the nineteenth basic embodiment thereof. In a power supply apparatus of the twentieth basic embodiment of this invention, the control portion includes means for, in cases where charge electric power of the storage battery exceeds a prescribed allowable maximum value or a prescribed reference value, decreasing the electric power generated by the power generating portion or increasing the sum of required electric power.

An excess of the sum of feedable electric power with respect to the sum of required electric power can be easily and surely detected from the charged electric power of the storage battery. The amount of electric power remaining in the storage battery is prevented from undesirably increasing by decreasing the generated electric power or increasing the required electric power.

According to a twenty-first basic embodiment of this invention, a power supply apparatus for a vehicle comprises a power feed portion including a power storage portion and a power generating portion. The power storage portion includes a storage battery. The power storage portion and the power generating portion transmit and receive electric power to and from each other. The power feed portion feeds electric power to a plurality of on-vehicle loads. A control portion operates for controlling the electric power fed from the power feed portion to the on-vehicle loads. The control portion includes means for, in cases where the sum of required electric power exhibits a variation, detecting the variation in the sum of required electric power on the basis of drive conditions of the on-vehicle loads or conditions of currents, means for changing electric power generated by the power generating portion in response to the detected variation, and means for, in cases where an increase in the sum of required electric power can not be met by an increase in the electric power generated by the power generating portion, discharging the storage battery to compensate for the difference therebetween. The sum of required electric power is equal to the sum of electric power consumed by all of electrically-powered loads including the on-vehicle loads.

First, the generated electric power is varied in accordance with a variation in the sum of required electric power (or the electric quantity related to the sum of required electric power) which is equal to the sum of electric power consumed by the on-vehicle loads. In the case where the variation in the sum of required electric power can not be met by the variation in the generated electric power, the electric power discharged from the power storage portion or the interchange electric power is used to compensate therefor. Accordingly, the charging and discharging of the power storage portion can be further suppressed. Thus, the life of the storage battery can be relatively long.

The variation in the sum of required electric power can be easily and surely detected from a variation in the charge and discharge electric power of the storage battery.

The generated electric power being a portion of the sum of feedable electric power is directly increased by using the fact that a non-accumulation result increase in the sum of required electric power exceeds the present sum of feedable electric power or the sum of feedable electric power at a suitable level. Therefore, it is possible to more quickly deal with an increase in the sum of required electric power. A variation in the amount of electric power remaining in the storage battery is relatively small. The number of times of charging and discharging of the storage battery is relatively small. As a result, the life of the storage battery is relatively long.

In the case where a large-sized on-vehicle load is suddenly activated, when the sum of required electric power exceeds the sum of feedable electric power (for example, the sum of currently-generated electric power and maximum or suitable electric power discharged from the storage battery), the generated electric power is promptly increased by a rate corresponding to the difference therebetween. Accordingly, even when the large-sized on-vehicle load is suddenly activated, the amount of electric power remaining in the storage battery can be prevented from significantly dropping.

A twenty-second basic embodiment of this invention is a modification of one of the first to twenty-first basic embodiments thereof. According to the twenty-second basic embodiment of this invention, the power generating portion includes an electric generator/motor driven by an engine. The control portion includes means for, in cases where the sum of feedable electric power is smaller than the sum of required electric power or it is predicted that the sum of feedable electric power is smaller than the sum of required electric power, giving preference to decreasing the sum of required electric power or adjusting the interchange electric power over starting the engine when the engine is at rest.

The engine is not started only to increase the sum of feedable electric power. Thus, the vehicle can be relatively silent.

A twenty-third basic embodiment of this invention is a modification of one of the first to twenty-second basic embodiments thereof. In a power supply apparatus of the twenty-third basic embodiment of this invention, the control portion includes means for calculating the sum of required electric power by adding a basic required power value and a consumed power value. The basic required power value corresponds to the rate of electric power fed to small-rating-power loads and prescribed important loads. The consumed power value corresponds to the total rate of consumption of electric power by the on-vehicle loads.

Examples of the small-rating-power loads are various control units and indicators. The sum of electric power consumed by the small-rating-power loads is previously calculated. Preferably, the maximum value of the sum of electric power consumed by the small-rating-power loads is previously calculated. A group of loads necessary for the travel of the vehicle are always in ON states during the travel of the vehicle. The sum of electric power consumed by the group of loads is previously calculated. Preferably, the maximum value of the sum of electric power consumed by the group of loads is previously calculated. The addition of the calculation result values is used as the basic required electric power value. It is unnecessary to detect the electric power consumed by each of the loads. In addition, it is possible to prevent the fed electric power from being insufficient due to an error in feed-forward control. Furthermore, the circuit structure can be relatively simple.

A twenty-fourth basic embodiment of this invention is a modification of one of the first to twenty-third basic embodiments thereof. In a power supply apparatus of the twenty-fourth basic embodiment of this invention, the control portion includes means for calculating or storing priority points of the on-vehicle loads which are as functions of basic points given to the on-vehicle loads for respective evaluation factors, and means for setting an order in which the sum of required electric power is decreased in accordance with the magnitudes of the priority points.

First one of the evaluation factors is use (also referred to as region) of each of the on-vehicle loads. The use is of various types such as a travel-purpose type, a safety-securing type, an air-conditioning type, and an entertainment type. High basic points are given to on-vehicle loads for travel and safety. Low basic points are given to other on-vehicle loads.

Second one of the evaluation factors is the effect provided by each of the on-vehicle loads. An example of the effect is one (referred to as a quantitative effect or an insensible effect) provided by operation of an on-vehicle load such as rotational speed of an electrically-driven hydraulic pump which does not directly act on human sensory organs. Another example of the effect is one (referred to as a qualitative effect or a sensible effect) provided by operation of an on-vehicle load such as the temperature of air discharged from an air conditioner which directly acts on the human sensory organs. A high basic point is given to the former on-vehicle load while a low basic point is given to the latter on-vehicle load.

The priority points of the on-vehicle loads can be determined by referring to a previously-stored table in which the priority points are indicated as values of functions of the basic points for the evaluation factors. The priority points of the on-vehicle loads can be calculated from the basic points of the on-vehicle loads for the evaluation factors according to prescribed equations.

The function value of each of the priority points can be calculated as follows. Data representing the basic points of the on-vehicle loads for the evaluation factors are stored. Each function value is calculated according to an equation using the related basic points as parameters (variables). In the case where the basic points of the on-vehicle loads for the evaluation factors are fixed, data representing previously-calculated function values or priority points may be stored for the on-vehicle loads, respectively. In this case, a calculation procedure or a mapping procedure can be omitted.

The priority point of each of the on-vehicle loads can be calculated as the sum or product of the related basic points. The basic points may be multiplied by different weighting coefficients.

Thus, the relative degrees of importance of the on-vehicle loads are made numerical. It is possible to determine the order in which the on-vehicle loads are suspended or the drive rates thereof are reduced. Furthermore, during a decrease in the sum of required electric power, it is possible to adjust the distribution of electric power to the on-vehicle loads in accordance with the priority points. The distribution of electric power to a plurality of on-vehicle loads which are simultaneously fed with partial power is implemented on the basis of the related function values. Thereby, it is possible to properly distribute the fed electric power among the on-vehicle loads.

The basic points given to the on-vehicle loads for the evaluation factors may be values which vary as functions of prescribed input parameters (input variables). The basic point given to an on-vehicle load for an air-conditioning purpose for the related evaluation factor can be altered depending on whether or not it is hot. Thereby, it is possible to prevent inconvenience from occurring when the sum of required electric power is decreased.

A twenty-fifth basic embodiment of this invention is a modification of the twenty-fourth basic embodiment thereof. The twenty-fifth basic embodiment of this invention features that the priority points or the basic points of prescribed ones of the on-vehicle loads are variable in time domain.

Since the priority points or the basic points of prescribed ones of the on-vehicle loads are varied in time domain during the reduction of the sum of required electric power, the priority-based order about the on-vehicle loads and the rate of decrease in the consumed electric power can be temporally changed.

Preferably, the priority points or the basic points of prescribed ones of the on-vehicle loads are periodically varied. More preferably, the priority point of first prescribed one of the on-vehicle loads is increased while the priority point of second prescribed one of the on-vehicle loads is decreased.

A twenty-sixth basic embodiment of this invention is a modification of the twenty-fourth basic embodiment or the twenty-fifth basic embodiment thereof. In a power supply apparatus of the twenty-sixth basic embodiment of this invention, the control portion includes means for determining drive rates of the on-vehicle loads in accordance with the priority points thereof.

The drive rates of the on-vehicle loads can be finely set in accordance with the priority points. In the case where the priority points of the on-vehicle loads or the basic points are temporally varied in accordance with the conditions of travel of the vehicle or other factors, the drive rates of the on-vehicle loads can be changed depending on the priority points.

Preferably, for each of the on-vehicle loads, the function determining the relation between the priority point and the drive rate is set, and data representative thereof are stored. The pattern of the partial drive, that is, the drive rate, in response to the priority point can be changed on a load-by-load basis.

The change of the drive point in response to the priority point during the reduction of the sum of required electric power is applied only to an on-vehicle load which can be partially driven. The change of the drive point in response to the priority point during the reduction of the sum of required electric power is not applied to an on-vehicle load which can assume only a fully-driven sate (an ON state) and a completely inactive state (an OFF state).

A twenty-seventh basic embodiment of this invention is a modification of one of the first to twenty-sixth basic embodiments thereof. In a power supply apparatus of the twenty-seventh basic embodiment of this invention, the control portion includes means for detecting whether or not the amount of electric power stored in the power storage portion is smaller than a prescribed value, and means for, when it is detected that the amount of electric power stored in the power storage portion is smaller than the prescribed value, increasing the sum of feedable electric power or decreasing the sum of required electric power. Thereby, it is possible to prevent the power storage portion from being excessively discharged (over-discharged).

A twenty-eighth basic embodiment of this invention is a modification of one of the first to twenty-seventh basic embodiments thereof. In a power supply apparatus of the twenty-eighth basic embodiment of this invention, the control portion includes means for detecting whether or not the amount of electric power stored in the power storage portion is smaller than a prescribed value, and means for, when it is detected that the amount of electric power stored in the power storage portion is not smaller than the prescribed value, decreasing the sum of feedable electric power. Thereby, it is possible to prevent the power storage portion from being excessively discharged (over-discharged).

A twenty-ninth basic embodiment of this invention is a modification of one of the first to twenty-eighth basic embodiments thereof. According to the twenty-ninth basic embodiment of this invention, the power generating portion includes an electric generator/motor driven by an engine. The control portion includes means for, in cases where the position of the vehicle is judged to be in a prescribed engine-drive-regulated region on the basis of information received from a vehicle position detecting device provided on the vehicle or from an external with respect to the vehicle or in response to an engine-drive-regulation signal received from an external with respect to the vehicle, suspending or decelerating the engine, and means for, in cases where a resultant decrease in the sum of feedable electric power causes the sum of feedable electric power to be lower than the sum of required electric power, decreasing the sum of required electric power or adjusting the interchange electric power to compensate for the decrease in the sum of feedable electric power.

Here, "suspending the engine" contains "maintaining the suspension of the engine". There are fixed stations provided for roads respectively. Each fixed station transmits information by radio which indicates that a related prescribed region is under regulations for limiting the rate of exhaust gas emission and the level of generated noise to predetermined values or less. The information received from the external with respect to the vehicle includes information which is transmitted from a fixed station by radio. The vehicle position detecting device provided on the vehicle includes, for example, a car navigation system. The vehicle position detecting device stores data representing prescribed engine-drive-regulated regions. When the position of the vehicle enters a prescribed engine-drive-regulated region, the vehicle position detecting device outputs a signal representative thereof. The data stored in the vehicle position detecting device which represent the prescribed engine-drive-regulated regions can be updated at regular intervals or on request.

When the position of the vehicle enters a prescribed engine-drive-regulated region, the engine is suspended or decelerated so that the rate of exhaust gas emission and the level of generated noise can be reduced. Since the suspension of the engine causes a decrease in the sum of feedable electric power, the sum of feedable electric power might drop below the sum of required electric power. When it is detected that the position of the vehicle enters a prescribed engine-drive-regulated region, the sum of required electric power is decreased or the interchange electric power is adjusted to prevent the sum of feedable electric power from dropping below the sum of required electric power. Thus, it is possible to prevent the power storage portion from being excessively discharged due to the suspension of the engine or the reduction of the power output from the engine. In addition, it is possible to maintain the power feed to necessary on-vehicle loads.

Each of the fixed stations has a sensor for detecting the exhaust gas concentration in atmosphere. Each of the fixed stations can adjust the radio transmission of information in response to the detected exhaust gas concentration or a command from a center. In the case where the detected exhaust gas concentration is relatively low, the effect of an engine-drive-regulation signal may be canceled. In this case, operation of the engine is maintained even when the position of the vehicle is in the prescribed engine-drive-regulated region. Thus, it is possible to prevent the power storage portion from being over-loaded.

The engine-drive regulations may be applied only to specified circumstances such as idling operation of the engine or the travel of the vehicle in a traffic snarl which do not need a great sum of required electric power. In this case, a command to suspend or decelerate the engine is given only when the engine is idling or the vehicle is traveling in a traffic snarl.

The engine-drive regulations may prescribe an upper limit of the rotational speed of an engine when a related vehicle is in the prescribed engine-drive-regulated region. In this case, engine noise can be effectively reduced at midnight.

A thirtieth basic embodiment of this invention is a modification of the twenty-ninth basic embodiment thereof. In a power supply apparatus of the thirtieth basic embodiment of this invention, the control portion includes means for judging whether or not the vehicle is in the prescribed engine-drive-regulated region and the present time is in a prescribed engine-drive-regulated time range, and means for suspending or decelerating the engine when it is judged that the vehicle is in the prescribed engine-drive-regulated region and the present time is in the prescribed engine-drive-regulated time range.

Not only the engine-drive-regulated region but also the time range of the engine-drive regulations is designated. Thus, the engine-drive regulations can be kept effective while a load on the vehicle can be reduced. The time range means a prescribed time range in a day or a prescribed term in a year.

According to a thirty-first basic embodiment of this invention, an engine-drive-regulation supporting apparatus mounted on a vehicle driven by an engine comprises engine-drive-regulated region detecting means including at least one of means for judging whether or not the position of the vehicle is in a prescribed engine-drive-regulated region on the basis of information received from a vehicle position detecting device provided on the vehicle or from an external with respect to the vehicle, and means for receiving an engine-drive-regulation signal from an external with respect to the vehicle. There is engine-drive regulating means for giving a notice to a vehicle driver, suspending the engine, or decelerating the engine when it is judged that the position of the vehicle is in the prescribed engine-drive-regulated region or in response to reception of the engine-drive-regulation signal.

Here, "suspending the engine" contains "maintaining the suspension of the engine". There are fixed stations provided for roads respectively. Each fixed station transmits information by radio which indicates that a related prescribed region is under regulations for limiting the rate of exhaust gas emission and the level of generated noise to predetermined values or less. The information received from the external with respect to the vehicle includes information which is transmitted from a fixed station by radio. The vehicle position detecting device provided on the vehicle includes, for example, a car navigation system. The vehicle position detecting device stores data representing prescribed engine-drive-regulated regions. When the position of the vehicle enters a prescribed engine-drive-regulated region, the vehicle position detecting device outputs a signal representative thereof. The data stored in the vehicle position detecting device which represent the prescribed engine-drive-regulated regions can be updated at regular intervals or on request.

When the position of the vehicle enters a prescribed engine-drive-regulated region, the engine is suspended or decelerated in response to the above-mentioned information so that the rate of exhaust gas emission and the level of generated noise can be reduced. The vehicle driver may be informed that the position of the vehicle enters the prescribed engine-drive-regulated region. In this case, the vehicle driver is urged to manually take a step of suspending or decelerating the engine. Accordingly, it is possible to reduce the rate of exhaust gas emission and the level of generated noise in the prescribed engine-drive-regulated region.

Each of the fixed stations has a sensor for detecting the exhaust gas concentration in atmosphere. Each of the fixed stations can adjust the radio transmission of information in response to the detected exhaust gas concentration or a command from a center. In the case where the detected exhaust gas concentration is relatively low, the effect of an engine-drive-regulation signal may be canceled. In this case, operation of the engine is maintained even when the position of the vehicle is in the prescribed engine-drive-regulated region. Thus, it is possible to prevent the power storage portion from being over-loaded.

A thirty-second basic embodiment of this invention is a modification of the thirty-first basic embodiment thereof. In an engine-drive-regulation supporting apparatus of the thirty-second basic embodiment of this invention, the engine-drive regulating means includes means for judging whether or not the vehicle is in the prescribed engine-drive-regulated region and the present time is in a prescribed engine-drive-regulated time range, and means for giving the notice to the vehicle driver, suspending the engine, or decelerating the engine when it is judged that the vehicle is in the prescribed engine-drive-regulated region and the present time is in the prescribed engine-drive-regulated time range.

Not only the engine-drive-regulated region but also the time range of the engine-drive regulations is designated. Thus, the engine-drive regulations can be kept effective while a load on the vehicle can be reduced. The time range means a prescribed time range in a day or a prescribed term in a year.

A thirty-third basic embodiment of this invention is a modification of one of the twenty-ninth to thirty-second basic embodiments thereof. A power supply apparatus or an engine-drive-regulation supporting apparatus of the thirty-third basic embodiment of this invention further comprises a manually-operated engine stop switch, and means provided in the control portion for stopping the engine in response to operation of the engine stop switch. The vehicle driver can execute the suspension of the engine by operating the engine stop switch. When the engine is suspended, the rate of exhaust gas emission and the level of generated noise can be reduced.

In the first to thirty-third basic embodiments of this invention, the power generating portion may include at least one of a fuel cell and an electric generator/motor coupled with the engine.

First Specific Embodiment

FIG. 1 shows a power supply apparatus according to a first specific embodiment of this invention. The power supply apparatus of FIG. 1 is designed for use in an automotive vehicle with a hybrid drive.

With reference to FIG. 1, the power supply apparatus includes an electric generator/motor 1, an AC-DC power converter 2, a high-voltage battery 3, a low voltage battery 4, a DC-DC power converter 5, high-voltage-driven accessories (on-vehicle loads) 6, 7, and 8, low-voltage-driven accessories (on-vehicle loads) 9, 10, and 11, and a power supply controller 12.

The high-voltage-driven accessories 6, 7, and 8, the low-voltage-driven accessories 9, 10, and 11, and the DC-DC power converter 5 are on-vehicle loads which can be controlled as will be mentioned later.

The electric generator/motor 1 can be operated in either a generator mode or a motor mode. The electric generator/motor 1 is of a three-phase synchronous type. The electric generator/motor 1 is provided between an engine 100 and a transmission 200 with a clutch. The electric generator/motor 1 is coupled with the crankshaft of the engine 100. Therefore, the electric generator/motor 1 can be driven by the engine 100 when being operated in the generation mode. The electric generator/motor 1 can assist the engine 100 to drive the vehicle when being operated in the motor mode. Also, the electric generator/motor 1 can drive the vehicle when being operated in the motor mode.

The AC-DC power converter 2 is electrically connected between the electric generator/motor 1 and the high-voltage battery 3. The AC-DC power converter 2 includes a three-phase inverter circuit which can implement AC-to-DC conversion and also DC-to-AC conversion. The AC-DC power converter 2 adjusts electric power transmitted between the electric generator/motor 1 and the high-voltage battery 3 in two ways. The electric generator/motor 1 and the AC-DC power converter 2 compose a power generating portion.

The high-voltage battery 3 includes a storage battery having a rating voltage in the range of 36 to 500 V. The high-voltage battery 3 is electrically connected to the high-voltage-driven accessories 6, 7, and 8. The high-voltage battery 3 feeds electric power to the high-voltage-driven accessories (the on-vehicle loads) 6, 7, and 8.

The low-voltage battery 4 includes a storage battery having a rating voltage of 12 V. The low-voltage battery 4 is electrically connected to the low-voltage-driven accessories 9, 10, and 11. The low-voltage battery 4 feeds electric power to the low-voltage-driven accessories (the on-vehicle loads) 9, 10, and 11. The high-voltage battery 3 and the low-voltage battery 4 compose a power storage portion.

The DC-DC power converter 5 is electrically connected between the high-voltage battery 3 and the low-voltage battery 4. The DC-DC power converter 5 includes a DC-DC converter. The DC-DC power converter 5 adjusts electric power (interchange electric power) transmitted between the high-voltage battery 3 and the low-voltage battery 4.

An engine control device 13 is associated or connected with the engine 100. The engine control device 13 acts to control the engine 100. The engine control device 13 includes an electronic control unit (ECU).

An electric generator/motor controller 14 is associated or connected with the electric generator/motor 1. The electric generator/motor controller 14 acts to control the electric generator/motor 1.

An accessory controller 15 is associated or connected with the high-voltage-driven accessories 6, 7, and 8, and also the low-voltage-driven accessories 9, 10, and 11. The accessory controller 15 acts to control the high-voltage-driven accessories 6, 7, and 8, and also the low-voltage-driven accessories 9, 10, and 11.

A battery controller 16 is associated or connected with the high-voltage battery 3 and the low-voltage battery 4. The battery controller 16 acts to manage and control the high-voltage battery 3 and the low-voltage battery 4. The battery controller 16 generates information about conditions of the high-voltage battery 3 and the low-voltage battery 4 which include discharge powers and discharge currents thereof. For example, each of the discharge powers is equal to the full charge power minus the remaining power in the related battery. The conditions of the high-voltage battery 3 and the low-voltage battery 4 further include the states of charge (SOC) thereof. The states of charge of the high-voltage battery 3 and the low-voltage battery 4 mean the amounts of electric power remaining therein.

The power supply controller 12 is electrically connected with the engine control device (ECU) 13, the electric generator/motor controller 14, the accessory controller 15, the battery controller 16, the AC-DC power converter 2, and the DC-DC power converter 5. The power supply controller 12 communicates with the engine control device 13, the electric generator/motor controller 14, the accessory controller 15, the battery controller 16, the AC-DC power converter 2, and the DC-DC power converter 5. The device 12 controls the AC-DC power converter 2 and the DC-DC power converter 5. The power supply controller 12 serves as a power generation and distribution controller. The power supply controller 12 includes a microcomputer or a similar device having a combination of an input/output port, a processing section, a ROM, and a RAM. The power supply controller 12 operates in accordance with a program stored in the ROM. The program has a main routine and a plurality of subroutines.

The AC-DC power converter 2 contains a sensor for detecting a current flowing therethrough. The DC-DC power converter 5 includes a sensor for detecting a current flowing therethrough.

The power supply controller 12 may be connected with the current sensors in the AC-DC power converter 2 and the DC-DC power converter 5. In this case, the power supply controller 12 receives signals from the current sensors which represent the currents flowing through the AC-DC power converter 2 and the DC-DC power converter 5.

Figure 2:
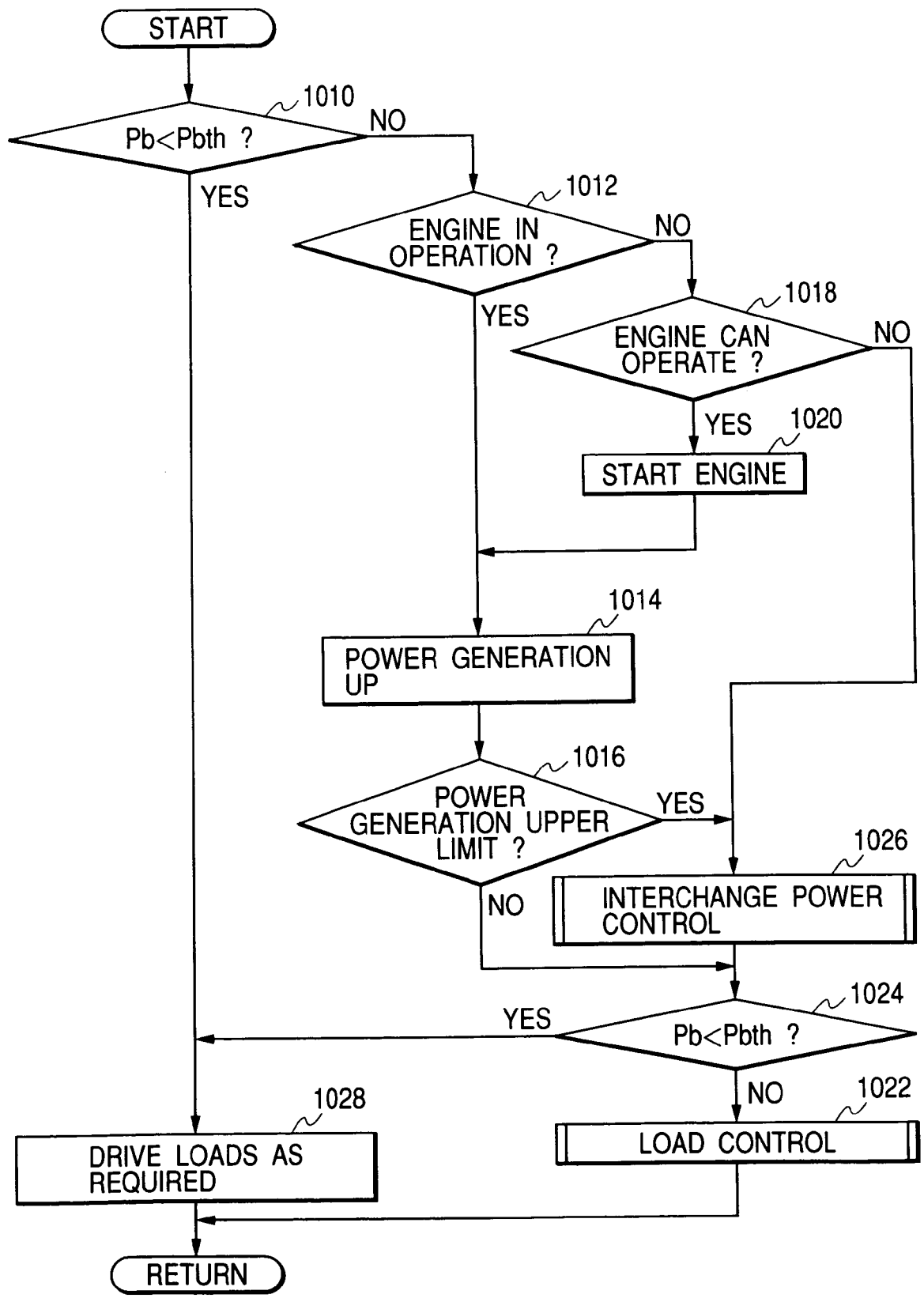
FIG. 2 is a flowchart of a segment of a program for a power supply controller in FIG. 1.

FIG. 2 is a flowchart of a segment (a main routine) of the program for the power supply controller 12 which is designed for increasing the sum of feedable electric power. In general, the sum of feedable electric power means the sum of electric power which can be fed from the high-voltage battery 3, electric power which can be fed from the low-voltage battery 4, and electric power generated by the electric generator/motor 1. The program segment in FIG. 2 copes with an increase in discharge power of the high-voltage battery 3. The program segment in FIG. 2 starts when an ignition switch (not shown) is changed to its ON position. At the start of the program segment, variables used therein are initialized. After the start, the program segment in FIG. 2 is repetitively executed.

With reference to FIG. 2, a first step 1010 of the program segment accesses the battery controller 16 and gets information about the discharge power Pb of the high-voltage battery 3. The discharge current of the high-voltage battery 3 may be used instead of the discharge power Pb thereof. The step 1010 determines whether or not the discharge power Pb is smaller than a prescribed value Pbth. When the discharge power Pb is smaller than the prescribed value Pbth, the program advances from the step 1010 to a step 1028. Otherwise, the program advances from the step 1010 to a step 1012.

The step 1012 accesses the engine control device 13 and gets information about operation of the engine 100. Alternatively, the step 1012 may access the electric generator/motor controller 14 to get information about operation of the engine 100. The step 1012 refers to the information, and determines whether or not the engine 100 is in operation. When the engine 100 is in operation, the program advances from the step 1012 to a step 1014. Otherwise, the program advances from the step 1012 to a step 1018.

The step 1014 updates a desired power generation value into a new one. Specifically, the step 1014 increases the desired power generation value by a quantity corresponding to the difference between the discharge power Pb and the prescribed value Pbth. The step 1014 accesses the electric generator/motor 1 via the electric generator/motor controller 14. The step 1014 commands the electric generator/motor 1 to generate electric power at a rate corresponding to the new desired power generation value. As a result, the electric generator/motor 1 generates electric power at an increased rate, and hence the sum of feedable electric power can be equal to or greater than the sum of required electric power.

The increase in the electric power generated by the electric generator/motor 1 causes an increase in the load on the engine 100. The increase in the load on the engine 100 is compensated for as follows. The electric generator/motor controller 14 informs the engine control device 13 of the increase in the electric power generated by the electric generator/motor 1. The engine control device 13 changes the torque output of the engine 100 or the gear ratio in the transmission 200 in response to the increase in the electric power generated by the electric generator/motor 1.

With reference back to FIG. 2, a step 1016 following the step 1014 determines whether or not the new desired power generation value exceeds a preset upper limit of power generation. When the new desired power generation value exceeds the preset upper limit, the program advances from the step 1016 to an interchange-power-amount control block (an interchange-power-amount control subroutine) 1026. Otherwise, the program advances from the step 1016 to a step 1024.

The interchange-power-amount control block 1026 has steps for transmitting electric power from the low-voltage battery 4 to the high-voltage battery 3. After the interchange-power-amount control block 1026, the program advances to the step 1024.

The step 1024 accesses the battery controller 16 and gets information about the discharge power Pb of the high-voltage battery 3. The discharge current of the high-voltage battery 3 may be used instead of the discharge power Pb thereof. The step 1024 determines whether or not the discharge power Pb is smaller than the prescribed value Pbth. When the discharge power Pb is smaller than the prescribed value Pbth, the program advances from the step 1024 to the step 1028. Otherwise, the program advances from the step 1024 to a load control block (a load control subroutine) 1022.

The step 1028 accesses the accessory controller 15 and enables the high-voltage-driven accessories 6, 7, and 8, and the low-voltage-driven accessories 9, 10, and 11 to be driven as required. After the step 1028, the current execution cycle of the program segment ends.

The load control block 1022 accesses the accessory controller 15, thereby controlling the on-vehicle loads, that is, the high-voltage-driven and low-voltage-driven accessories 6, 7, 8, 9, 10, and 11. Thus, the load control block 1022 implements the load control. After the load control block 1022, the current execution cycle of the program segment ends.

The step 1018 accesses the engine control device 13 and gets information about conditions of the engine 100. The step 1018 accesses suitable devices (not shown) and gets information about conditions of the vehicle. The step 1018 determines whether or not the engine 100 is able to start on the basis of the conditions of the engine 100 and the conditions of the vehicle. When the engine 100 is able to start, the program advances from the step 1018 to a step 1020. Otherwise, the program advances from the step 1018 to the interchange-power-amount control block 1026.

Specifically, the step 1018 determines whether or not the conditions of the engine 100 are in a range for stop. When the conditions of the engine 100 are in the range for stop, the step 1018 judges that the engine 100 is not able to start. The step 1018 determines whether or not a necessary amount of fuel remains in a tank. When the necessary amount of fuel remains in the tank, the step 1018 judges that the engine 100 is able to start.

The step 1020 accesses the engine control device 13 and enables the engine 100 to start. After the step 1020, the program advances to the step 1014.

The high-voltage-driven and low-voltage-driven accessories 6, 7, 8, 9, 10, and 11, that is, the on-vehicle loads, include specified ones permitted to be suspended or permitted to be reduced in drive rate. The specified accessories (the specified on-vehicle loads) have different degrees of importance, respectively.

The load control block 1022 calculates a shortage of power generation which is equal to the new desired power generation value minus the preset upper limit of power generation. The load control block 1022 refers to a table or a list in which the specified accessories (the specified on-vehicle loads) are arranged in the order of importance degree. The load control block 1022 selects one or ones from the specified accessories which are lower in importance degree than others. The load control block 1022 accesses the accessory controller 15, thereby suspending the selected accessories or reducing the drive rates of the selected accessories to compensate for the shortage of power generation. In this way, the load control block 1022 reduces the sum of required electric power.

The interchange-power-amount control block 1026 controls the DC-DC power converter 5 to transmit electric power from the low-voltage battery 4 to the high-voltage battery 3 under the condition that the amount of electric power remaining in the low-voltage battery 4 is equal to or greater than a prescribed level. The interchange-power-amount control block 1026 compensates for a residual portion of the shortage of power generation which can not be removed by the load control block 1022 in the previous execution cycle of the program segment.

The power supply controller 12 and the load control block 1022 will be further described. Different degrees of importance are assigned to the specified accessories (the specified on-vehicle loads) and the DC-DC power converter 5 for each of various patterns of operating conditions of the vehicle. The power supply controller 12 stores data representing a list for each of the patterns of operating conditions of the vehicle. In each list, the specified accessories (the specified on-vehicle loads) and the DC-DC power converter 5 are arranged in the order of importance degree. Also, the power supply controller 12 stores data representing a list of one or ones of the on-vehicle loads and the DC-DC power converter 5 which are inhibited from being suspended. For one or ones of the on-vehicle loads and the DC-DC power converter 5 which can not be suspended but can be reduced in drive rate, the power supply controller 12 stores data representing a minimum drive rate or minimum drive rates.

The load control block 1022 determines required electric power to be reduced by the load control. The load control block 1022 detects the present operating conditions of the vehicle by accessing the engine control device 13. The load control block 1022 selects one from the lists which corresponds to an operating condition pattern matching with or being the closest to the present operating conditions of the vehicle. By referring to the selected list, the load control block 1022 selects one or ones from the specified on-vehicle loads and the DC-DC power converter 5 which are lower in importance degree than others. The load control block 1022 accesses the accessory controller 15, thereby suspending the selected on-vehicle loads (which can include the DC-DC power converter 5) or reducing the drive rates of the selected on-vehicle loads to decrease the sum of required electric power by a quantity equal to the required electric power to be reduced by the load control. Specifically, the load control block 1022 suspends ones of the specified on-vehicle loads and the DC-DC power converter 5 which can be suspended, or decreases the drive rates of ones of the specified on-vehicle loads and the DC-DC power converter 5 by maximum limits which can not be suspended in the order of importance degree from the lowest toward the highest until a decrease in the sum of required electric power reaches the required electric power to be reduced by the load control.

The reductions in the drive rates are implemented by decreasing the duty ratios in PWM control of the related on-vehicle loads (which can include the DC-DC power converter 5). In the case of one or ones of the on-vehicle loads which can be intermittently driven, the reductions in the drive rates may be implemented by executing the intermittent drive. Preferably, in the case where two or more of the on-vehicle loads are intermittently driven, the timings of the intermittent drive differ from each other so that the on-vehicle loads can be prevented from being simultaneously driven. The duty ratios in PWM control of the on-vehicle loads may be periodically increased and decreased instead of the implementation of the intermittent drive. Preferably, in the case where the duty ratios in PWM control of two or more of the on-vehicle loads are periodically increased and decreased, the timings at which the duty ratios are maximized are different from each other so that a peak of consumed electric power can be suppressed.

When the discharge power Pb of the high-voltage battery 3 is equal to or greater than the prescribed value Pbth (see the step 1010), the electric power generated by the electric generator/motor 1 is increased (see the step 1014) so that the sum of feedable electric power can be equal to or greater than the sum of required electric power. Here, the sum of feedable electric power means the sum of the electric power which can be fed from the high-voltage battery 3, the electric power which can be fed from the low-voltage battery 4, and the electric power generated by the electric generator/motor 1. The sum of electric power actually fed from the high-voltage battery 3, electric power actually fed from the low-voltage battery 4, and electric power actually generated by the electric generator/motor 1 is equal to the sum of consumed electric power (the sum of required electric power). According to the above-mentioned design, the high-voltage battery 3 can be relatively small in size. Furthermore, the above-mentioned design prevents the high-voltage battery 3 from being discharged at a great current level (a great power rate) which might cause deterioration thereof.

A considerable increase in the discharge power of the high-voltage battery 3 is detected (see the step 1010). When such an increase in the discharge power of the high-voltage battery 3 is detected, the electric power generated by the electric generator/motor 1 is increased promptly (see the step 1014). Thus, it is possible to suppress a variation in the amount of electric power in the high-voltage battery 3 and a change in the rate of the discharging thereof which are caused by the increase in the discharge power thereof. In addition, it is possible to prevent the high-voltage battery 3 from being deteriorated by the power amount variation and the discharging rate change.

In the case where the new desired power generation value exceeds the preset upper limit of power generation (see the step 1016), electric power is transmitted from the low-voltage battery 4 to the high-voltage battery 3 (see the interchange-power-amount control block 1026). In the case where the discharge power Pb of the high-voltage battery 3 remains equal to or greater than the prescribed value Pbth (see the step 1024) after the electric power generated by the electric generator/motor 1 is increased, one or ones of the on-vehicle loads which have relatively low degrees of importance are suspended or the drive rates thereof are reduced. Therefore, the high-voltage battery 3 can be relatively small in capacity. In addition, the power supply apparatus of FIG. 1 is able to feed electric power at a great rate.

Second Specific Embodiment

A second specific embodiment of this invention is a modification of the first specific embodiment thereof. According to the second specific embodiment of this invention, an SOC control block precedes the step 1010 in FIG. 2. The SOC control block has a step of accessing the battery controller 16 and getting information about the state of charge (SOC) of the high-voltage battery 3, that is, the amount of electric power remaining in the high-voltage battery 3. In addition, the SOC control block has a step of determining whether or not the amount of electric power remaining in the high-voltage battery 3 is smaller than a preset reference value. Under the condition that the amount of electric power remaining in the high-voltage battery 3 is smaller than the preset reference value, the power-generation increasing step 1014 and the load control block 1022 are executed. As a result, the amount of electric power remaining in the high-voltage battery 3 can be prevented from dropping below the preset reference value.

In the second specific embodiment of this invention, the high-voltage battery 3 can be relatively small in size. In addition, it is possible to prevent the high-voltage battery 3 from being discharged at a great current level. Furthermore, it is possible to prevent the high-voltage battery 3 from being excessively discharged (over-discharged). Therefore, the life of the high-voltage battery 3 can be relatively long.

Third Specific Embodiment

A third specific embodiment of this invention is a modification of the first specific embodiment thereof. According to the third specific embodiment of this invention, the step 1010 in FIG. 2 accesses the battery controller 16 and gets information about the sum of electric power fed from the high-voltage battery 3 and consumed by all the related loads. The step 1010 determines whether or not the sum of feedable electric power is smaller than the sum of electric power fed from the high-voltage battery 3 and consumed by all the related loads. Here, the sum of feedable electric power means the sum of the upper limit of the capacity of the high-voltage battery 3 and the currently-generated electric power. When the sum of feedable electric power is smaller than the sum of electric power fed from the high-voltage battery 3 and consumed by all the related loads, the program advances from the step 1010 to the step 1012. Otherwise, the program advances from the step 1010 to the step 1028. As a result, the sum of feedable electric power can be kept equal to or greater than the sum of electric power fed from the high-voltage battery 3 and consumed by all the related loads.

Fourth Specific Embodiment

Figure 3:
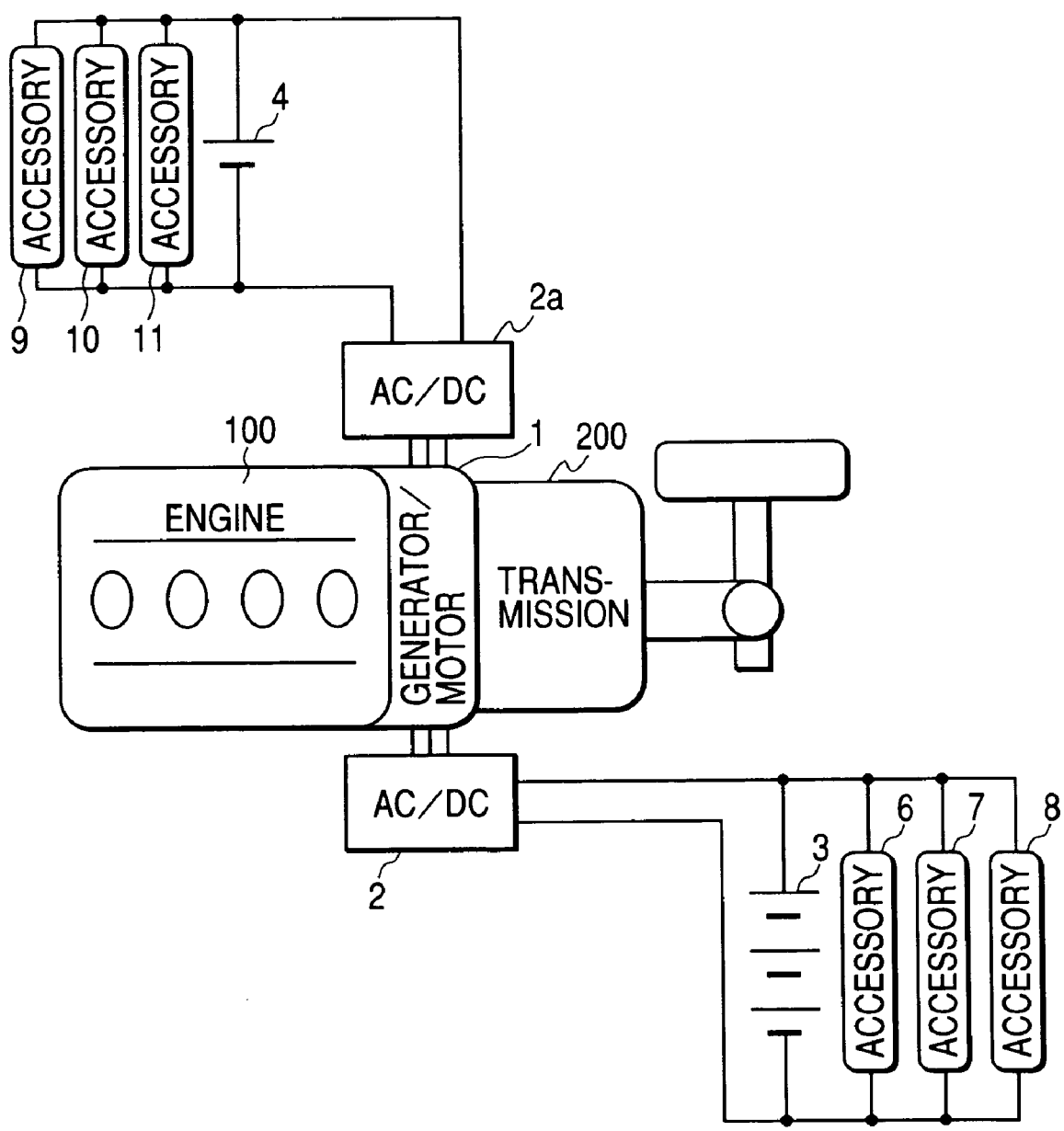
FIG. 3 is a diagram of a power supply apparatus according to a fourth specific embodiment of this invention.

FIG. 3 shows a power supply apparatus according to a fourth specific embodiment of this invention. The power supply apparatus of FIG. 3 is similar to the power supply apparatus of FIG. 1 except for design changes mentioned hereafter.

The DC-DC power converter 5 (see FIG. 1) is omitted from the power supply apparatus of FIG. 3. There is an AC-DC power converter 2*a* electrically connected between the electric generator/motor 1 and the low-voltage battery 4. The electric generator/motor 1 includes first and second armature coils coupled with the AC-DC power converters 2 and 2*a* respectively. The AC-DC power converter 2*a* can transmit electric power between the electric generator/motor 1 and the low-voltage battery 4 (and the low-voltage-driven accessories 9, 10, and 11). The AC-DC power converter 2*a* is electrically connected with the power supply controller 12 (see FIG. 1). The AC-DC power converter 2*a* can be controlled by the power supply controller 12.

The interchange-power-amount control block 1026 in FIG. 2 controls the AC-DC power converter 2*a* to transmit electric power from the low-voltage battery 4 to the electric generator/motor 1. As a result, the electric generator/motor 1 receives a greater torque and generates electric power at a higher rate. Thus, greater electric power can be transmitted from the electric generator/motor 1 to the high-voltage battery 3 via the AC-DC power converter 2. In this way, electric power is transmitted from the low-voltage battery 4 to the high-voltage battery 3.

Fifth Specific Embodiment

Figure 4:
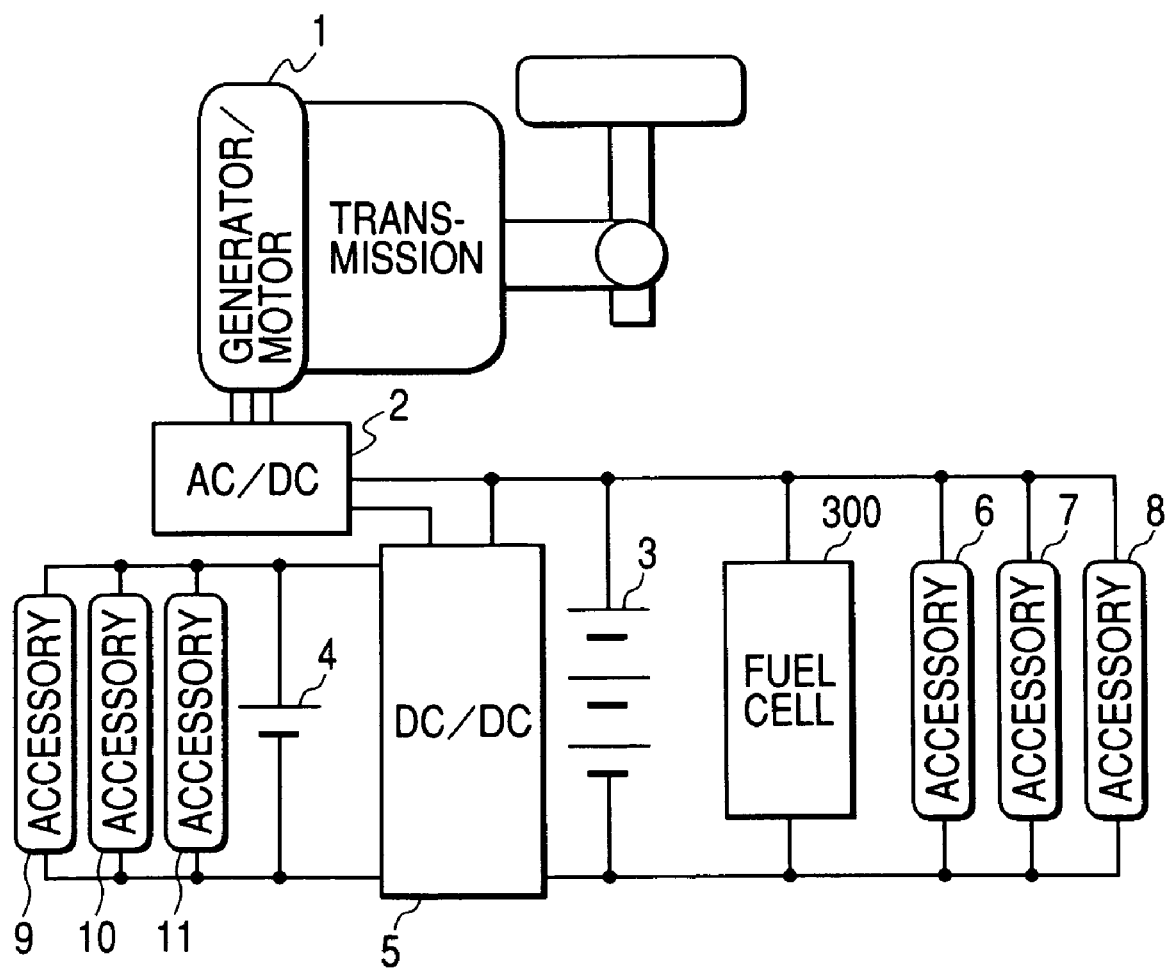
FIG. 4 is a diagram of a power supply apparatus according to a fifth specific embodiment of this invention.

FIG. 4 shows a power supply apparatus according to a fifth specific embodiment of this invention. The power supply apparatus of FIG. 4 is similar to the power supply apparatus of FIG. 1 except for design changes mentioned hereafter.

The engine 100 (see FIG. 1) is omitted from the power supply apparatus of FIG. 4. There is a fuel cell 300 connected in parallel with the high-voltage battery 3. It should be noted that the high-voltage battery 3 may be replaced by a capacitor having a great capacity.

Figure 5:
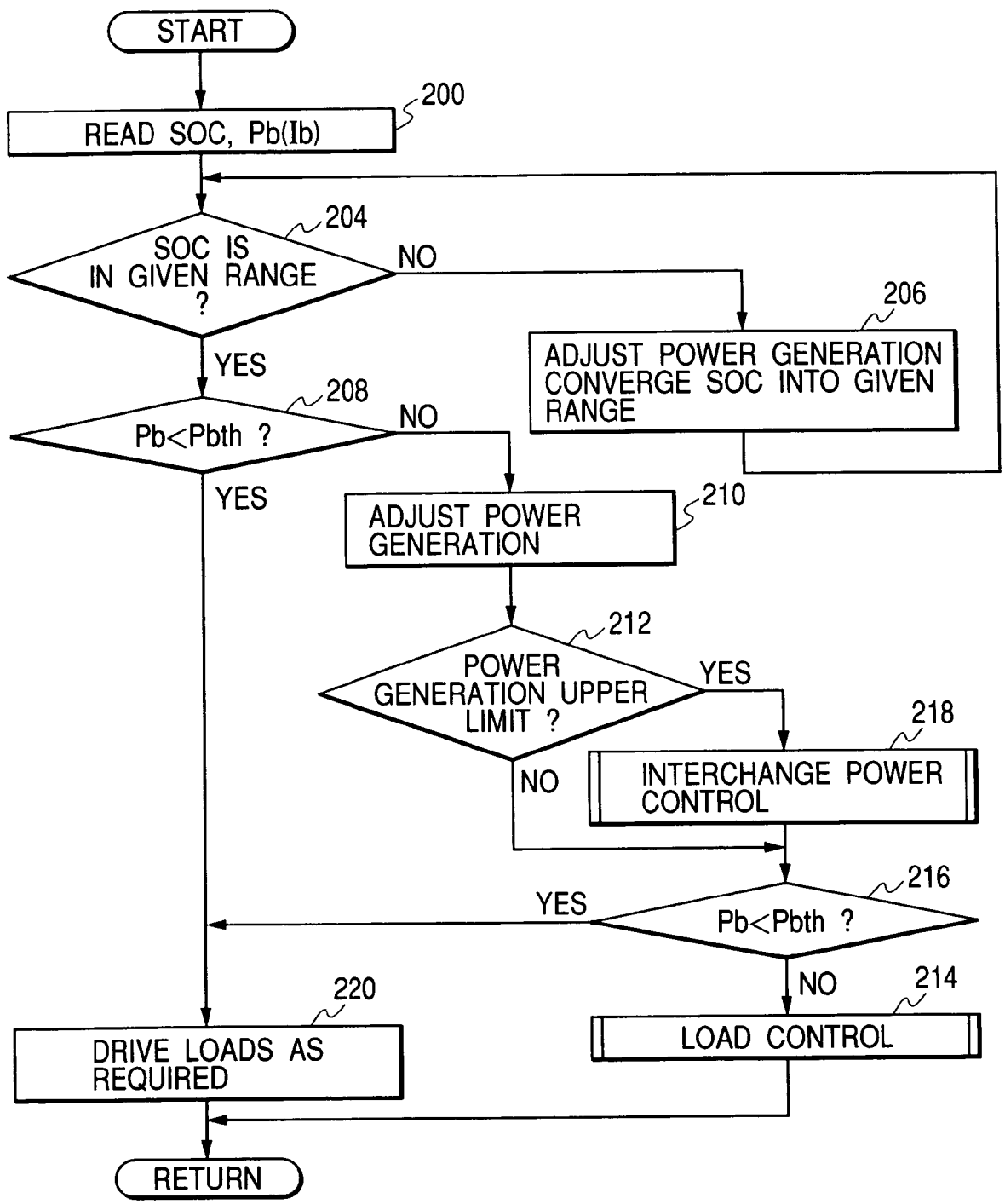
FIG. 5 is a flowchart of a segment of a program for a power supply controller in the fifth specific embodiment of this invention.

FIG. 5 is a flowchart of a segment (a main routine) of the program for the power supply controller 12 (see FIG. 1). The program segment in FIG. 5 starts when an ignition switch (not shown) is changed to its ON position. At the start of the program segment, variables used therein are initialized. After the start, the program segment in FIG. 5 is repetitively executed.

With reference to FIG. 5, a first step 200 of the program segment accesses the battery controller 16 (see FIG. 1) and gets information about the state of charge (SOC) of the high-voltage battery 3 and the discharge power Pb thereof. The state of charge of the high-voltage battery 3 corresponds to the amount of electric power remaining therein. The discharge current Ib of the high-voltage battery 3 may be used instead of the discharge power Pb thereof. After the step 200, the program advances to a step 204.

The step 204 determines whether or not the state of charge of the high-voltage battery 3 is in a prescribed acceptable range, that is, whether or not the amount of electric power remaining in the high-voltage battery 3 is in a prescribed acceptable range (for example, 40 to 60% of the fully-charged level). When the state of charge of the high-voltage battery 3 is in the prescribed acceptable range, the program advances from the step 204 to a step 208. Otherwise, the program advances from the step 204 to a step 206.

The step 206 accesses the electric generator/motor 1 via the electric generator/motor controller 14 (see FIG. 1). The step 206 controls the power generation by the electric generator/motor 1 in the direction of moving the state of charge of the high-voltage battery 3 back into the prescribed acceptable range. Specifically, when the state of charge of the high-voltage battery 3 exceeds the upper limit of the prescribed acceptable range, the step 206 reduces the power generation by the electric generator/motor 1. Preferably, the reduction in the power generation is designed so that the state of charge of the high-voltage battery 3 can move back into the prescribed acceptable range at a given SOC drop rate. On the other hand, when the state of charge of the high-voltage battery 3 is below the lower limit of the prescribed acceptable range, the step 106 increases the power generation by the electric generator/motor 1. Preferably, the increase in the power generation is designed so that the state of charge of the high-voltage battery 3 can move back into the prescribed acceptable range at a given SOC rise rate. After the step 206, the program returns to the step 204.

The step 208 determines whether or not the discharge power Pb is smaller than the prescribed value Pbth. When the discharge power Pb is smaller than the prescribed value Pbth, the program advances from the step 208 to a step 220. Otherwise, the program advances from the step 208 to a step 210.

The step 210 accesses the electric generator/motor 1 via the electric generator/motor controller 14 (see FIG. 1). The step 210 adjusts the power generation by the electric generator/motor 1 in response to the discharge power Pb. For example, the step 210 equalizes the power generation to the discharge power Pb. In more detail, the step 210 updates a desired power generation value into a new one in response to the discharge power Pb. The step 210 commands the electric generator/motor 1 via the electric generator/motor controller 14 (see FIG. 1) to generate electric power at a rate corresponding to the new desired power generation value. As a result, the electric generator/motor generates electric power at an adjustment-resultant rate.

A step 212 following the step 210 determines whether or not the new desired power generation value exceeds the preset upper limit of power generation. When the new desired power generation value exceeds the preset upper limit, the program advances from the step 212 to an interchange-power-amount control block (an interchange-power-amount control subroutine) 218. Otherwise, the program advances from the step 212 to a step 216.

The interchange-power-amount control block 218 is similar to the interchange-power-amount control block 1026 in FIG. 2. After the interchange-power-amount control block 218, the program advances to the step 216.

The step 216 accesses the battery controller 16 (see FIG. 1) and gets information about the discharge power Pb of the high-voltage battery 3. The discharge current of the high-voltage battery 3 may be used instead of the discharge power Pb thereof. The step 216 determines whether or not the discharge power Pb is smaller than the prescribed value Pbth. When the discharge power Pb is smaller than the prescribed value Pbth, the program advances from the step 216 to the step 220. Otherwise, the program advances from the step 216 to a load control block (a load control subroutine) 214.

The step 220 is similar to the step 1028 in FIG. 2. The step 220 accesses the accessory controller 15 (see FIG. 1) and enables the high-voltage-driven accessories 6, 7, and 8, and the low-voltage-driven accessories 9, 10, and 11 to be driven as required. After the step 220, the current execution cycle of the program segment ends.

The load control block 214 is similar to the load control block 1022 in FIG. 2. The load control block 214 implements the load control. Specifically, the load control block 214 decreases the sum of required electric power. After the load control block 214, the current execution cycle of the program segment ends.

Even in the case where the state of charge of the high-voltage battery 3 is in the prescribed acceptable range, the electric power generated by the electric generator/motor 1 is increased promptly (see the step 210) when a considerable increase in the discharge power of the high-voltage battery 3 is detected (see the step 208). Thus, it is possible to suppress a variation in the state of charge of the high-voltage battery 3.

Sixth Specific Embodiment

A sixth specific embodiment of this invention is a modification of the fifth specific embodiment thereof. The sixth specific embodiment of this invention has the following feature. In the case where a command to change the sum of required electric power is given and then the resultant sum of required electric power is equal to or greater than the sum of feedable electric power, the execution of the command to change the sum of required electric power is permitted at or after the moment of instructing an increase in the sum of feedable electric power or a decrease in the sum of required electric power so that the sum of feedable electric power can exceed the resultant sum of required electric power. It is possible to prevent the occurrence of a problem when the on-vehicle loads are driven although the sum of feedable electric power is insufficient.

Seventh Specific Embodiment

A seventh specific embodiment of this invention is a modification of the first specific embodiment thereof. According to the seventh specific embodiment of this invention, the load control block 1022 in FIG. 2 is modified as follows.

Figures 6, 7:
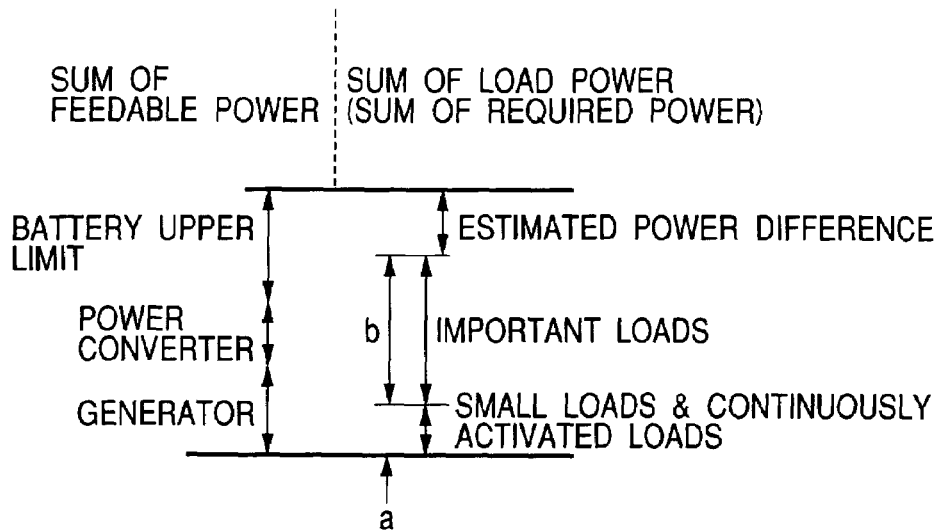
FIG. 6 is a diagram of the relation between the sum of feedable electric power and the sum of required electric power.
FIG. 7 is a diagram of the assignment of priority points to on-vehicle loads.

With reference to FIG. 6, the sum of required electric power is divided into a basic required power value "a" and a consumed power value "b". The basic required power value "a" corresponds to the rate of electric power fed to small-rating-power loads and prescribed important loads. The consumed power value "b" corresponds to the total rate of consumption of electric power by the on-vehicle loads. Thus, the sum of required electric power is equal to "a+b".

Regarding the basic required power value "a", the rates of consumption of electric power by the small-rating-power loads and the prescribed important loads are not detected, and preset constant values are used as indications thereof. Thus, the electric power consumed by the small-rating-power loads is handled as uncontrollable electric power. Accordingly, the power supply apparatus can be relatively simple in structure and relatively light in weight. Also, the electric power consumed by the prescribed important loads is handled as uncontrollable electric power. Therefore, it is possible to prevent the amount of fed electric power from being insufficient due to an error in feed-forward control. In addition, it is possible to simplify the structure of a circuit for calculating and detecting the sum of required electric power.

Eighth Specific Embodiment

An eighth specific embodiment of this invention is a modification of the first specific embodiment thereof. According to the eighth specific embodiment of this invention, the load control block 1022 in FIG. 2 is modified as follows.

According to the eighth specific embodiment of this invention, the power supply controller 12 (see FIG. 1) stores data representing a map having contents as shown in FIG. 7.

With reference to FIG. 7, on-vehicle loads which can be fed with electric power from the high-voltage battery 3 (see FIG. 1) are denoted by "A", "B", "C", "D", "E", and "F" respectively. The on-vehicle loads "A", "B", "C", "D", "E", and "F" include the high-voltage-driven accessories 6, 7, and 8 (see FIG. 1), and other on-vehicle loads. Concerning each of evaluation factors (evaluation items), basic points are given to the on-vehicle loads "A", "B", "C", "D", "E", and "F". The basic points determine a synthetic evaluation point for each of the on-vehicle loads "A", "B", "C", "D", "E", and "F". The synthetic evaluation point is also referred to as a priority point.

In FIG. 7, the basic points in the column "range" indicate the degrees of importance of the on-vehicle loads "A", "B", "C", "D", "E", and "F" which are decided according to uses thereof. High basic points are given to the on-vehicle loads "A", "B", and "C" which are designed for the travel of the vehicle and the guarantee of safety. Low basic points are given to the on-vehicle loads "D", "E", and "F" which are designed for the air-conditioning purpose and the entertainment purpose.

In FIG. 7, the basic points in the column "function" indicate the degrees of importance of the on-vehicle loads "A", "B", "C", "D", "E", and "F" which are decided according to the functions thereof. High basic points are given to the on-vehicle loads "A" and "E" which are designed to be continuously fed with electric power. A low basic point is given to the on-vehicle load "C" which can be partially or intermittently driven.

In FIG. 7, the basic points in the column "effect" indicate the degrees of importance of the on-vehicle loads "A", "B", "C", "D", "E", and "F" which are decided according to the effects provided thereby. High basic points are given to the on-vehicle loads "B", "C", and "D" providing quantitative effects or insensible effects which do not directly act on human sensory organs. An example of the quantitative effects or the insensible effects is one caused by the rotational speed of an electrically-driven hydraulic pump. A low basic point is given to the on-vehicle load "F" providing a qualitative effect or a sensible effect which directly acts on the human sensory organs. An example of the qualitative effect or the sensible effect is the temperature of air discharged from an air conditioner.

In the column "special control" of FIG. 7, basic points equal to variables "x" and "y" are given to the on-vehicle loads "C" and "E" respectively. A basic point of "1" is given to the on-vehicle loads "A", "B", "D", and "F". The variable "x" is in the range between "0.7" and "1.0". The variable "y" is in the range between "0.5" and "1.0".

Figure 8:
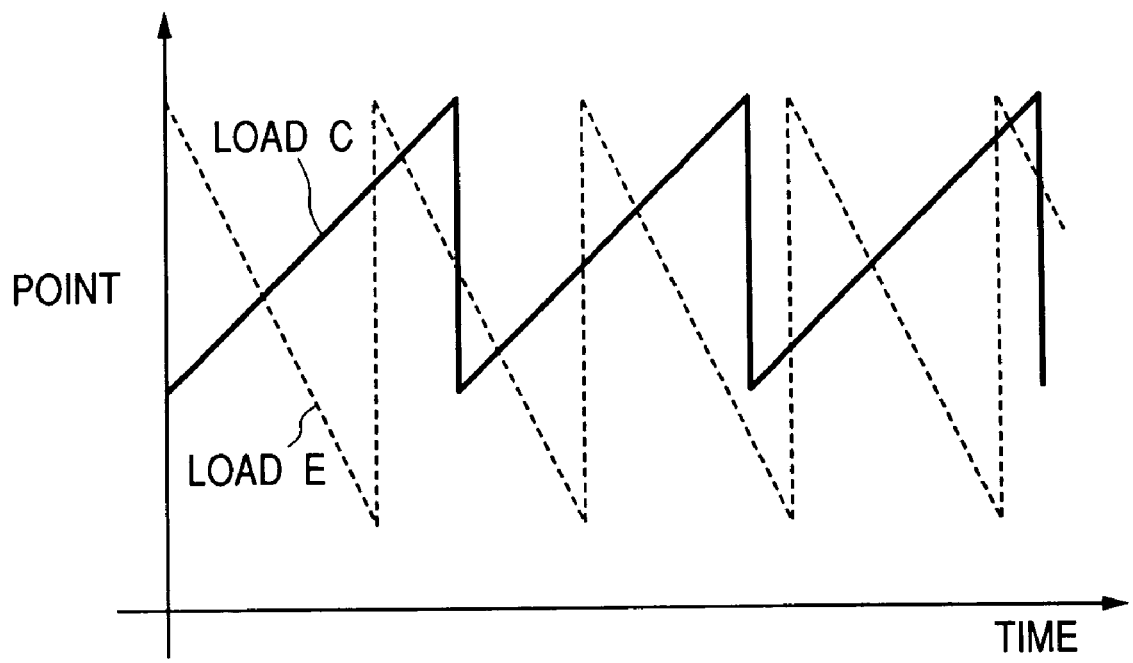
FIG. 8 is a time-domain diagram of variations in points assigned to on-vehicle loads.

Here, "special control" means control of varying a related basic point in time domain as shown in a map of FIG. 8. Regarding on-vehicle loads having similar priority points, "special control" sequentially varies the priority points so that the on-vehicle loads can be sequentially driven. Generally, the points "x" and "y" in "special control" are varied in predetermined patterns. Data representing the predetermined patterns (data representing the map of FIG. 8) are stored as a table. The basic points "x" and "y" in "special control" may be varied by using random values in prescribed ranges.

It is possible to reduce electric power consumed by ones of the on-vehicle loads "A", "B", "C", "D", "E", and "F" which are not provided with PWM control devices, and which can not be partially driven.

The load control block 1022 (see FIG. 2) executed by the power supply controller 12 (see FIG. 1) determines the basic points "x" and "y" by referring to the map of FIG. 8. The load control block 1022 places the determined basic points "x" and "y" in the map of FIG. 7. Subsequently, the load control block 1022 calculates the priority points of the on-vehicle loads "A", "B", "C", "D", "E", and "F" by referring to the map of FIG. 7 and using prescribed functions. According to the calculated priority points, the load control block 1022 decides the order in which the on-vehicle loads "A", "B", "C", "D", "E", and "F" are suspended or the drive rates of the on-vehicle loads "A", "B", "C", "D", "E", and "F" are decreased. Specifically, the load control block 1022 selects one or ones from the on-vehicle loads "A", "B", "C", "D", "E", and "F" which are lower in priority points than others. The load control block 1022 suspends the selected on-vehicle loads or decreases the drive rates of the selected on-vehicle loads to compensate for the shortage of power generation. In this way, the load control block 1022 reduces the sum of required electric power.

In FIG. 7, the priority points of the on-vehicle loads "A", "B", "D", and "F" are fixed. Therefore, regarding the on-vehicle loads "A", "B", "D", and "F", only data representing the priority points may be stored.

Generally, the prescribed functions for the calculation of the priority points of the on-vehicle loads "A", "B", "D", and "F" from the basic points are the same. Alternatively, the prescribed functions may differ from each other. An example of each of the prescribed functions is one for calculating a mean value from the related basic points or one for calculating the product of the related basic points. The basic points may be multiplied by weighting coefficients before the calculation of the priority points.

Ninth Specific Embodiment

A ninth specific embodiment of this invention is similar to the eighth specific embodiment thereof except for design changes mentioned hereafter. As previously mentioned, the on-vehicle loads "A", "B", "D", and "F" have the fixed priority points. The on-vehicle loads "A", "B", "D", and "F" include electric motors. In the case where the electric-motor loads are required to be simultaneously turned on, they are sequentially started in the order of priority point or in a prescribed order. Thus, the timings of start of the electric-motor loads are different so that the total load on the power storage portion is prevented from excessively increasing.

Regarding specified one or ones of the electric-motor loads, the related priority points may be increased from original values only during the time interval of the start thereof. In this case, during the time interval of the start of the specified electric-motor load or loads, sufficient electric power is fed thereto while electric power fed to other on-vehicle loads is reduced. The feed of sufficient electric power to the specified electric-motor load or loads enables operation thereof to be quickly stabilized. After the operation of the specified electric-motor load or loads is stabilized, the related priority points are decreased to the original values.

Tenth Specific Embodiment

Figure 9:
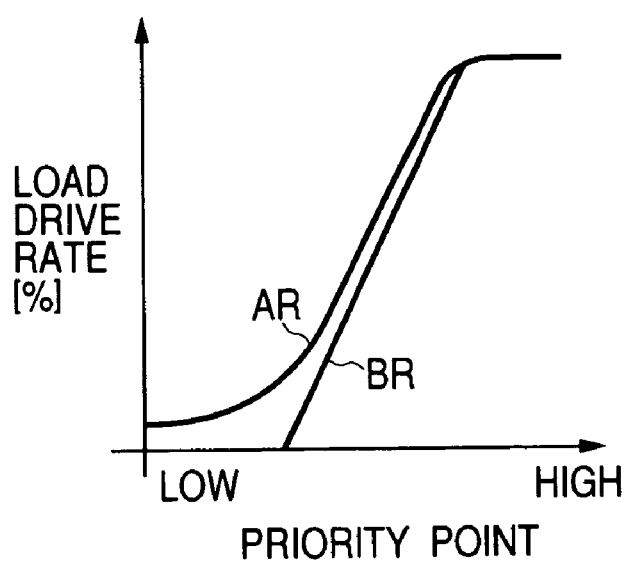
FIG. 9 is a diagram of examples of the relation between a priority point of an on-vehicle load and a drive rate thereof.

A tenth specific embodiment of this invention is a modification of the eighth specific embodiment thereof. FIG. 9 shows examples AR and BR of the relation between the priority point of an on-vehicle load and the drive rate thereof in the tenth specific embodiment of this invention. According to the relation AR, the drive rate of an on-vehicle load remains equal to a given small value when the priority point thereof is low. According to the relation BR, the drive rate of an on-vehicle load is set to 0% when the priority point thereof is low. Thus, in this case, the on-vehicle load is completely suspended when the priority point thereof is low. The relation AR causes a high possibility that various on-vehicle loads are selected as activated ones. The relation BR causes on-vehicle loads with higher priorities to be regarded as more important. In this way, weighting the on-vehicle loads in operation can be altered. Data representing a function corresponding to the relation between the priority point of an on-vehicle load and the drive rate thereof are stored in the power supply controller 12 (see FIG. 1) as a map. Therefore, the on-vehicle loads are sequentially started and driven in the order from the highest priority toward the lowest priority until the sum of required electric power reaches the specified upper limit.

Figure 10:
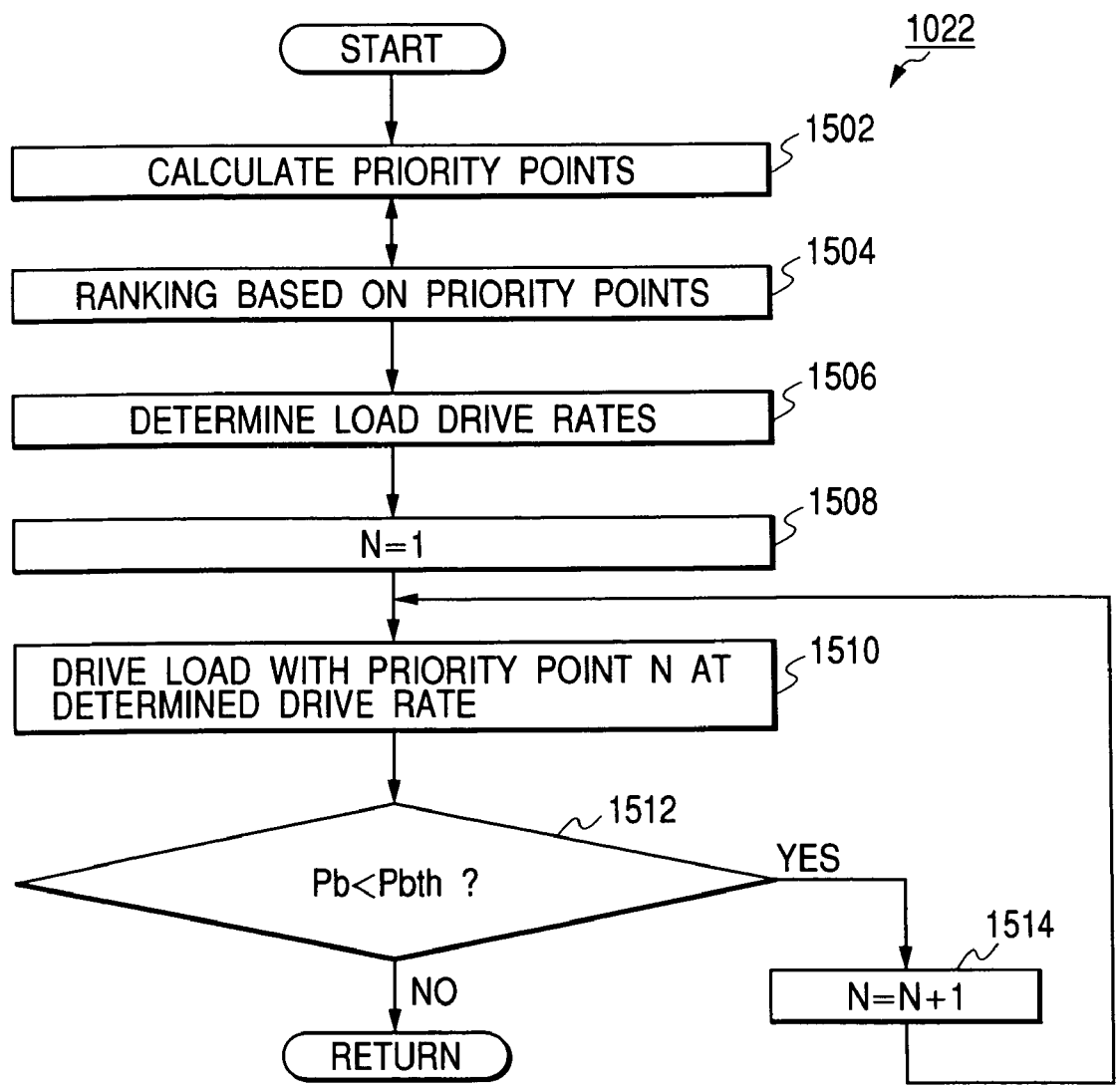
FIG. 10 is a flowchart of the internal structure of a load control block in a program according to a tenth specific embodiment of this invention.

FIG. 10 is a flowchart of the internal structure of the load control block 1022 (see FIG. 2) in the tenth specific embodiment of this invention. With reference to FIG. 10, the load control block 1022 includes a first step 1502 which calculates the priority points of the on-vehicle loads by referring to the map of FIG. 7.

A step 1504 following the step 1502 decides ranking about the on-vehicle loads according to the calculated priority points. Specifically, the step 1504 gives different priority-point-based order numbers to the on-vehicle loads respectively. The order numbers start from "1".

A step 1506 subsequent to the step 1504 determines the drive rates of the on-vehicle loads on the basis of the priority points according to functions as those in FIG. 9.

A step 1508 following the step 1506 sets a load designation number N to "1". After the step 1508, the program advances to a step 1510.

The step 1510 accesses the on-vehicle load having an order number equal to the load designation number N. The step 1510 activates the accessed on-vehicle load at the related drive rate. In the case where the accessed on-vehicle load is of the ON/OFF type, the step 1510 merely turns on the accessed on-vehicle load.

A step 1512 subsequent to the step 1510 determines whether or not the discharge power Pb is smaller than the prescribed value Pbth, that is, whether or not the high-voltage battery 3 (see FIG. 1) stores sufficient power. When the discharge power Pb is smaller than the prescribed value Pbth, that is, when the high-voltage battery 3 stores sufficient power, the program advances from the step 1512 to a step 1514. Otherwise, the program advances from the step 1512 and then exists from the load control block 1022.

The step 1514 increments the load designation number N by "1" according to the program statement "N=N+1". After the step 1514, the program returns to the step 1510.

As a result, ones of the on-vehicle loads are sequentially started and activated until the electric power stored in the high-voltage battery 3 becomes insufficient.

Eleventh Specific Embodiment

An eleventh specific embodiment of this invention is a modification of the eighth specific embodiment thereof. The eleventh specific embodiment of this invention features feed-forward load control such that the sum of the estimated powers consumed by the on-vehicle loads is calculated, and the on-vehicle loads are driven so as to hold the sum of the estimated powers equal to or below a prescribed value.

Figure 11:
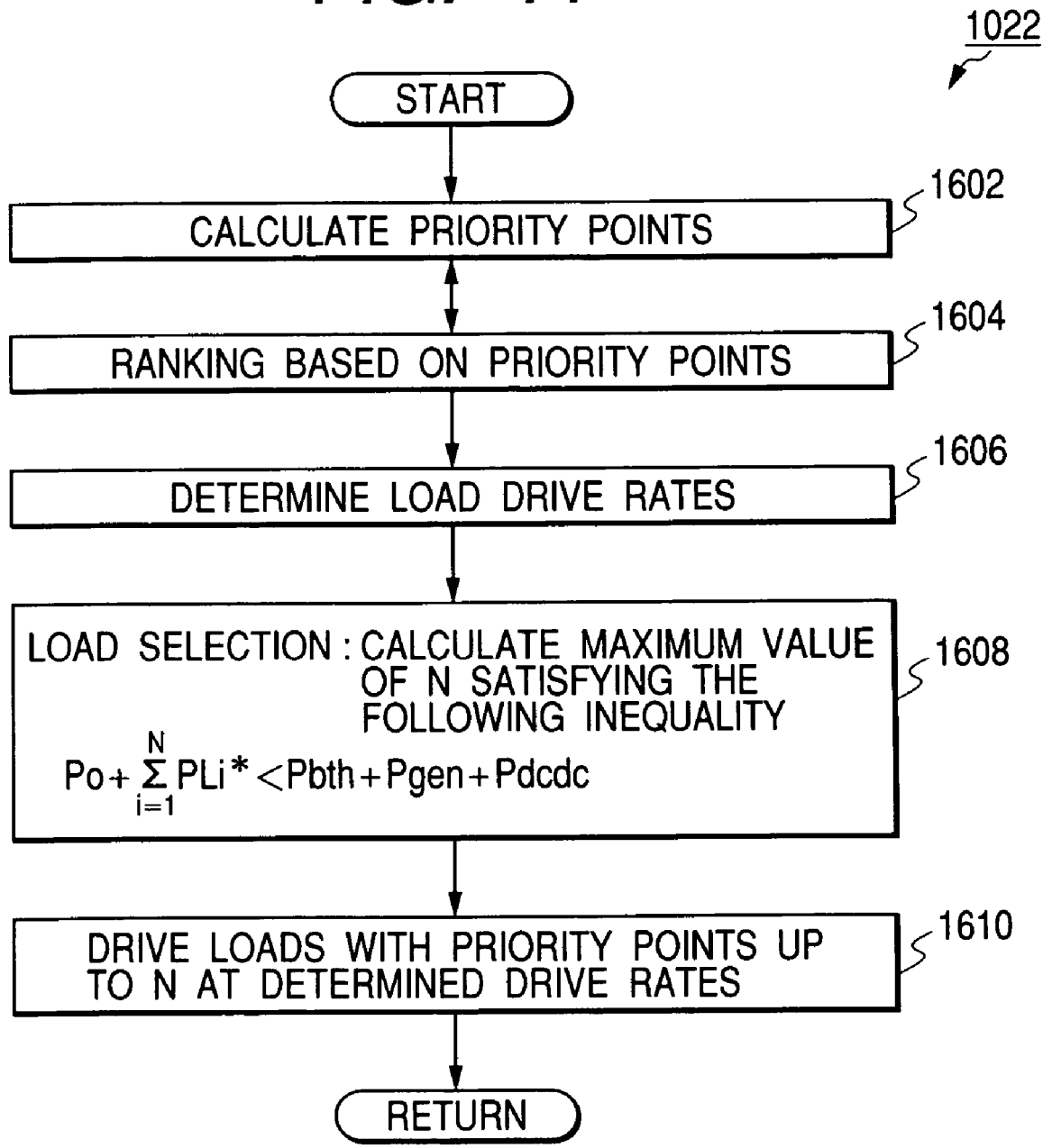
FIG. 11 is a flowchart of the internal structure of a load control block in a program according to an eleventh specific embodiment of this invention.

FIG. 11 is a flowchart of the internal structure of the load control block 1022 (see FIG. 2) in the eleventh specific embodiment of this invention. With reference to FIG. 11, the load control block 1022 includes a first step 1602 which calculates the priority points of the on-vehicle loads by referring to the map of FIG. 7.

A step 1604 following the step 1602 decides ranking about the on-vehicle loads according to the calculated priority points. Specifically, the step 1604 gives different priority-point-based order numbers to the on-vehicle loads respectively. The order numbers start from "1".

A step 1606 subsequent to the step 1604 determines the drive rates of the on-vehicle loads on the basis of the priority points according to functions as those in FIG. 9.

A step 1608 following the step 1606 selects one or ones from the on-vehicle loads which should be driven. The selection is based on the order from the lowest priority point toward the highest priority point. Specifically, the step 1608 estimates the sum of electric power consumed by small-rating-power loads among the on-vehicle loads. The estimated power sum is denoted by "Po". The step 1608 predicts the sum of electric powers PLi consumed by ones of the on-load vehicles which have order numbers "i" up to N, where i=1, 2, . . . . In other words, the step 1608 executes calculation as follows.

$$\sum_{i=1}^{N} PLi$$

The step 1608 adds the estimated power sum Po and the predicted power sum. The step 1608 gets information about the prescribed value Pbth which means an allowable output power value of the high-voltage battery 3 (see FIG. 1). The step 1608 gets information about the power Pgen generated by the electric generator/motor 1 (see FIG. 1). The step 1608 gets information about the interchange power Pdcdc which can be provided via the DC-DC power converter 5 (see FIG. 1). The step 1608 calculates the sum of the allowable output power value Pbth, the generated power Pgen, and the interchange power Pdcdc. The step 1608 determines the maximum value of N under the condition that the result of the addition of the estimated power sum Po and the predicted power sum is smaller than the sum of the allowable output power value Pbth, the generated power Pgen, and the interchange power Pdcdc as indicated by the following inequality.

$$Po + \sum_{i=1}^{N} PLi < Pbth + Pgen + Pdcdc$$

Thus, the step 1608 selects ones from the on-vehicle loads which have order numbers up to the maximum value of N.

A step 1610 subsequent to the step 1608 accesses the selected on-vehicle loads (that is, the on-vehicle loads having order numbers up to the maximum value of N). The step 1610 activates the accessed on-vehicle loads at the related drive rates. In the case of an accessed on-vehicle load of the ON/OFF type, the step 1610 merely turns on the accessed on-vehicle load. After the step 1610, the program exists from the load control block 1022.

Twelfth Specific Embodiment

A twelfth specific embodiment of this invention is a modification of the first specific embodiment thereof. The twelfth specific embodiment of this invention relates to an engine-drive-regulation supporting apparatus which has the function of suspending the engine 100 or operating the engine 100 at a low output power when the vehicle is in a prescribed engine-drive-regulated region. Preferably, this function is implemented independently of the load control by the first specific embodiment of this invention. The function may be implemented through the load control block 1022 (see FIG. 2).

Figure 12:
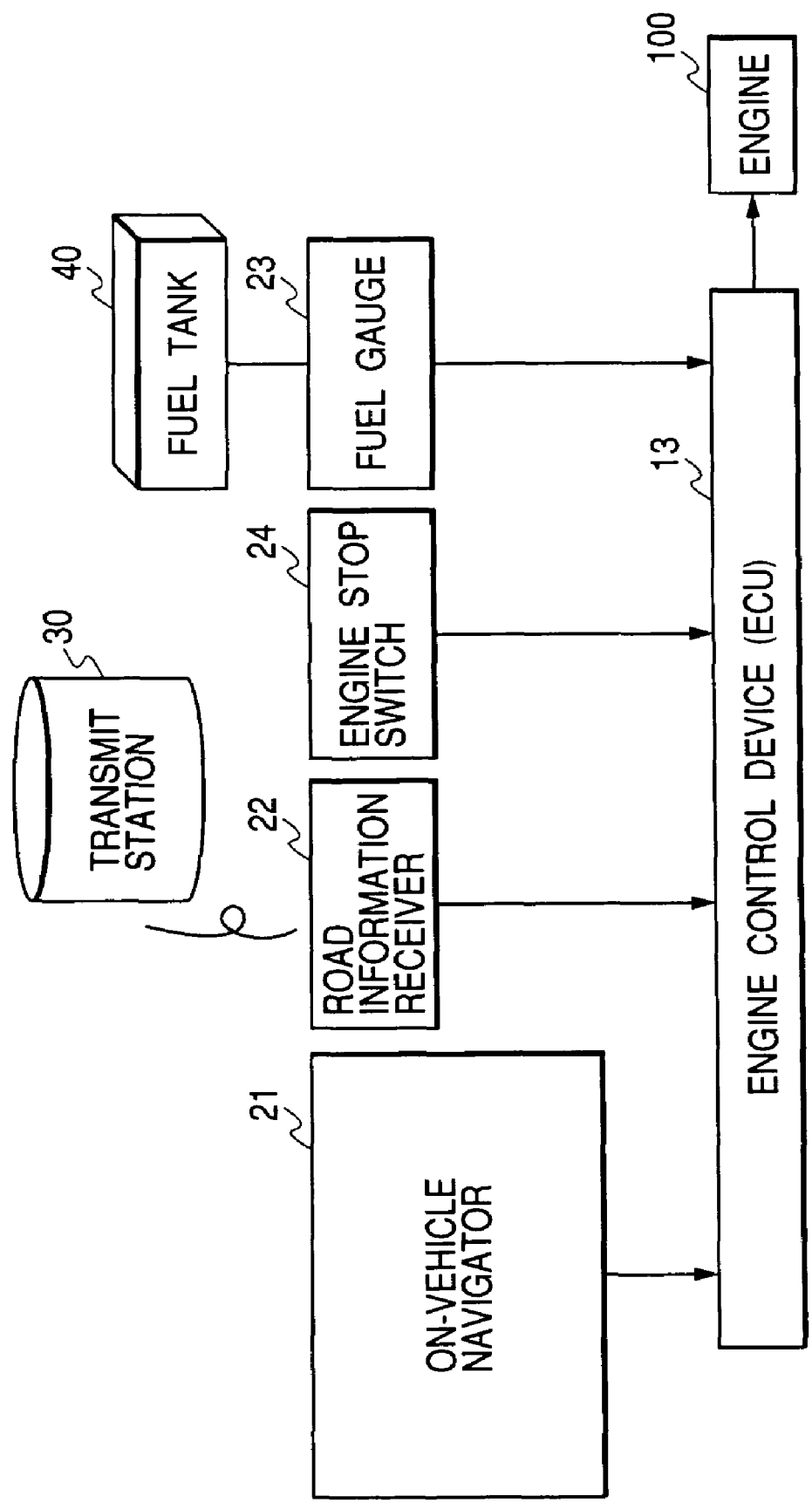
FIG. 12 is a diagram of an engine-drive-regulation supporting apparatus according to a twelfth specific embodiment of this invention.

FIG. 12 shows the engine-drive-regulation supporting apparatus mounted on the vehicle. With reference to FIG. 12, the vehicle is equipped with an on-vehicle navigator 21, a road information receiver 22, and a remaining-fuel-amount meter (a fuel gauge) 23. The engine control device (ECU) 13 communicates with the navigator 21, the road information receiver 22, and the remaining-fuel-amount meter 23. The engine control device 13 receives information from a manually-operated engine stop switch 24 which represents the position or state thereof. The engine control device 13 stores data (information) representing a prescribed engine-drive-regulated region and data (information) representing a prescribed engine-drive-regulated time range.

The navigator 21 generates information about the present position of the vehicle. The navigator 21 notifies the present position of the vehicle to the engine control device 13. The navigator 21 may store data (information) representing a prescribed engine-drive-regulated region and data (information) representing a prescribed engine-drive-regulated time range. In this case, when the vehicle enters the prescribed engine-drive-regulated region or the present time enters the prescribed engine-drive-regulated time range, the navigator 21 feeds the engine control device 13 with a signal representative thereof.

The road information receiver 22 catches a signal from a road information transmitting station 30 located at a side of a road. The signal from the road information transmitting station 30 constitutes received information which contains information about roads, information about a prescribed engine-drive-regulated region, information representing whether or not an area (roads) around the station 30 is in the prescribed engine-drive-regulated region, information about the present time, information about a prescribed engine-drive-regulated time range, and information representing whether or not the present time is in a prescribed engine-drive-regulated time range. The road information receiver 22 transfers the received information to the engine control device 13.

The fuel-remaining-amount meter 23 measures the amount of fuel remaining in a tank 40. The fuel-remaining-amount meter 23 notifies the measured remaining fuel amount to the engine control device 13. When the amount of fuel remaining in the tank 40 drops below a prescribed value (for example, a substantially empty level), the fuel-remaining-amount meter 23 feeds the engine control device 13 with a signal representative thereof.

The engine control device (ECU) 13 has a combination of an input/output port, a processing section, a ROM, and a RAM. The engine control device 13 operates in accordance with a program stored in the ROM.

Figure 13:
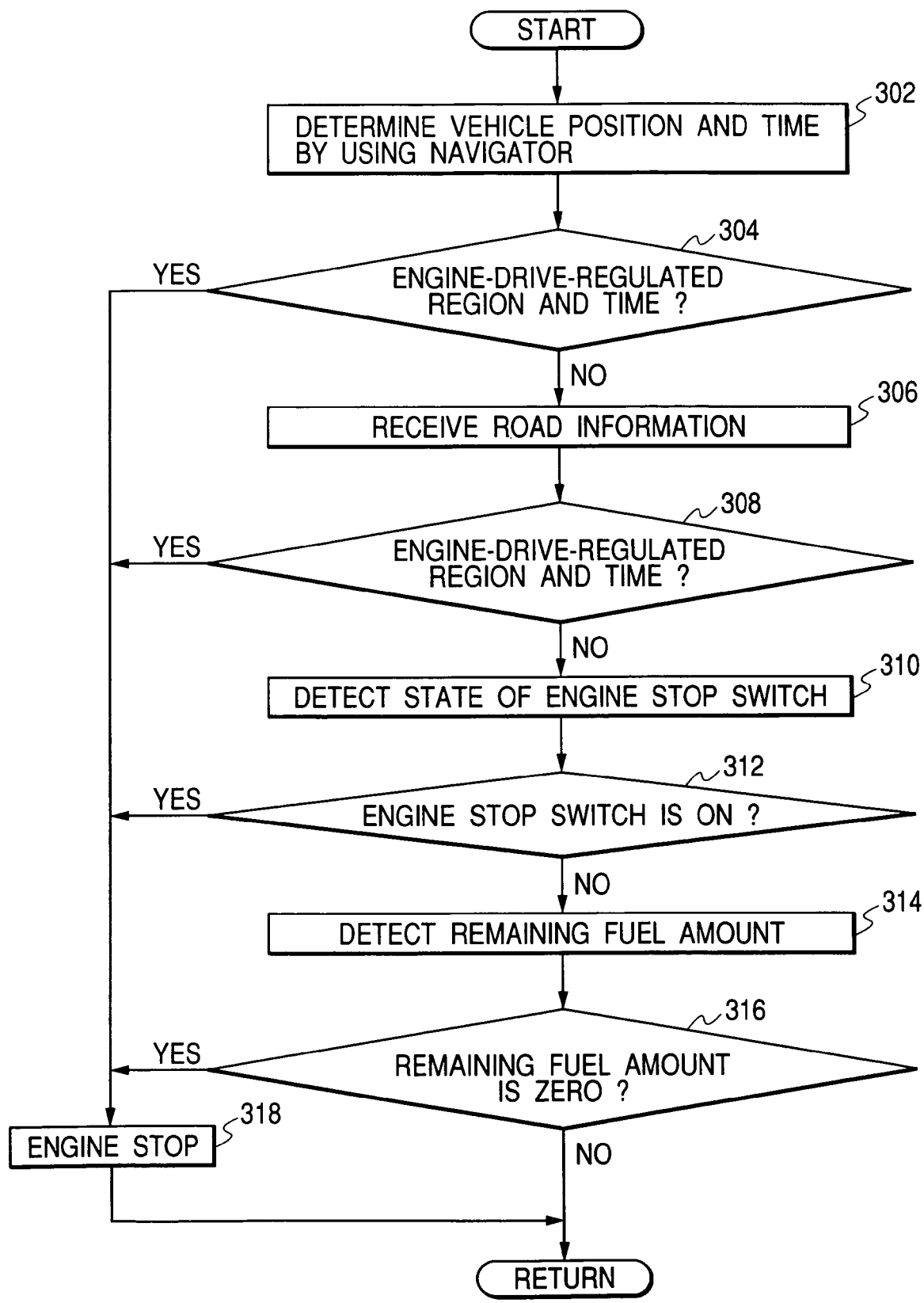
FIG. 13 is a flowchart of a segment of a program for an engine control device in the twelfth specific embodiment of this invention.

FIG. 13 is a flowchart of a segment (a routine) of the program for the engine control device 13. The program segment in FIG. 13 is repetitively executed. With reference to FIG. 13, a first step 302 of the program segment receives information about the present position of the vehicle and information about the present time from the navigator 21 and the road information receiver 22. The step 302 may access a clock in the engine control device 13 to get information about the present time.

A step 304 following the step 302 retrieves the information about the prescribed engine-drive-regulated region and the information about the prescribed engine-drive-regulated time range. The step 304 determines whether or not the present position of the vehicle is in the prescribed engine-drive-regulated region. In addition, the step 304 determines whether or not the present time is in the prescribed engine-drive-regulated time range. When the present position of the vehicle is in the prescribed engine-drive-regulated region and the present time is in the prescribed engine-drive-regulated time range, the program advances from the step 304 to a step 318. Otherwise, the program advances from the step 304 to a step 306.

The step 306 accesses the road information receiver 22 and gets the received information therefrom.

A step 308 subsequent to the step 306 refers to the received information, and determines whether or not the present position of the vehicle is in the prescribed engine-drive-regulated region. In addition, the step 308 determines whether or not the present time is in the prescribed engine-drive-regulated time range. When the present position of the vehicle is in the prescribed engine-drive-regulated region and the present time is in the prescribed engine-drive-regulated time range, the program advances from the step 308 to the step 318. Otherwise, the program advances from the step 308 to a step 310.

The step 310 accesses the engine stop switch 24 and receive the information therefrom.

A step 312 following the step 310 refers to the information from the engine stop switch 24, and determines whether or not the engine stop switch 24 is in its ON position. When the engine stop switch 24 is in its ON position, the program advances from the step 312 to the step 318. Otherwise, the program advances from the step 312 to a step 314.

The step 314 accesses the fuel-remaining-amount meter 23 and gets information about the amount of fuel remaining in the tank 40.

A step 316 subsequent to the step 314 determines whether or not the amount of fuel remaining in the tank 40 is substantially equal to zero. When the amount of fuel remaining in the tank 40 is substantially equal to zero, the program advances from the step 316 to the step 318. Otherwise, the program exits from the step 316 and then the current execution cycle of the program segment ends.

The step 318 suspends or stops the engine 100. Thus, the vehicle is driven by the electric generator/motor 1 (see FIG. 1) using the electric power fed from the high-voltage battery 3 (see FIG. 1). After the step 318, the current execution cycle of the program segment ends.

As a result, the amount of exhaust gas emitted from the vehicle can be reduced when the vehicle is in the prescribed engine-drive-regulated region. In addition, the amount of exhaust gas emitted from the vehicle can be reduced during the prescribed engine-drive-regulated time range.

Thirteenth Specific Embodiment

Figure 14:
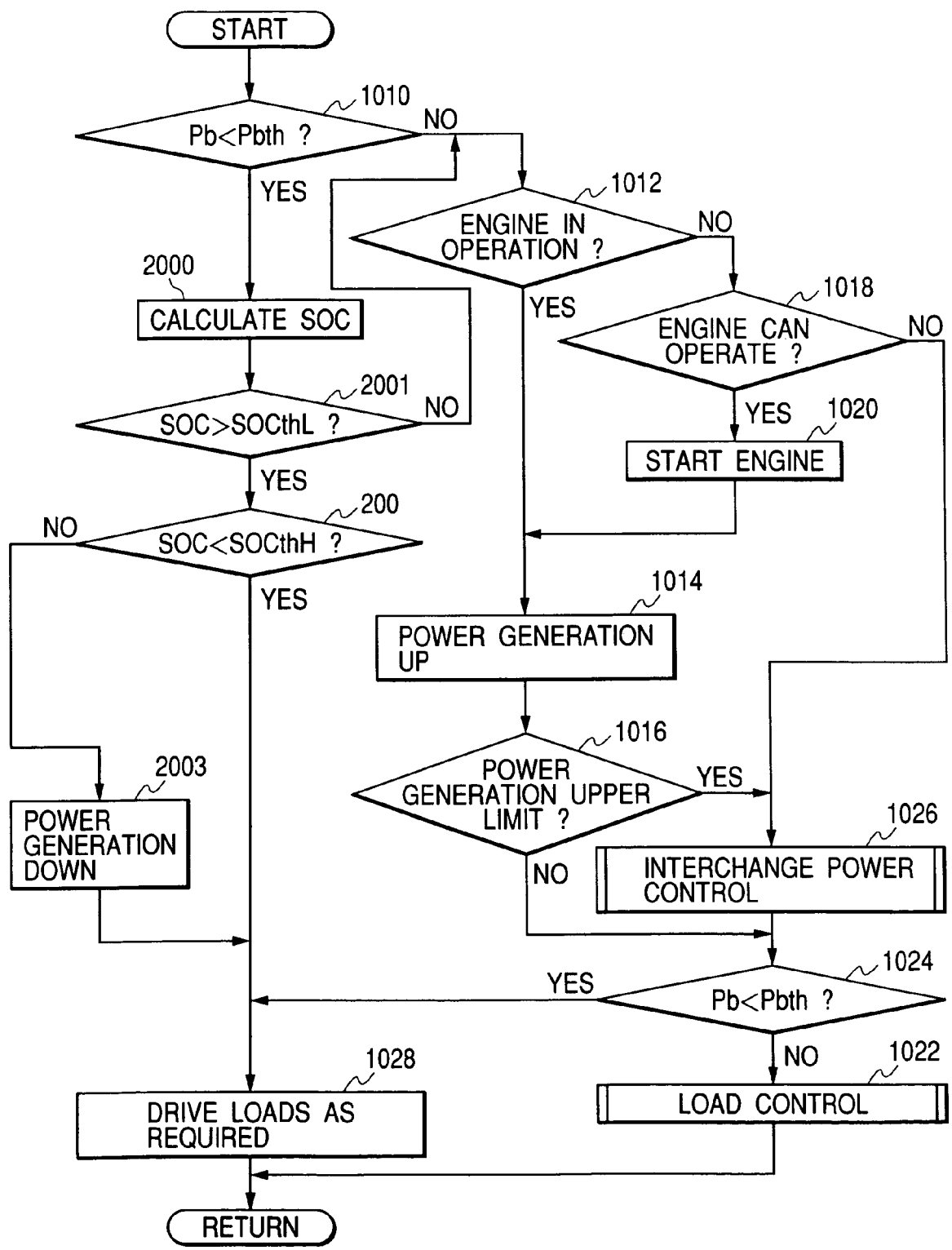
FIG. 14 is a flowchart of a segment of a program for a power supply controller in a thirteenth specific embodiment of this invention.

A thirteenth specific embodiment of this invention is a modification of the first specific embodiment thereof. FIG. 14 is a flowchart of a segment of the program for the power supply controller 12 (see FIG. 1) in the thirteenth specific embodiment of this invention. The program segment in FIG. 14 is similar to the program segment in FIG. 2 except for design changes mentioned hereafter.

With reference to FIG. 14, the step 1010 determines whether or not the discharge power Pb is smaller than the prescribed value Pbth. When the discharge power Pb is smaller than the prescribed value Pbth, the program advances from the step 1010 to a step 2000. Otherwise, the program advances from the step 1010 to the step 1012.

The step 2000 accesses the battery controller 16 (see FIG. 1) and gets information about the state of charge (SOC) of the high-voltage battery 3 (see FIG. 1), that is, the amount of electric power remaining in the high-voltage battery 3. The state of charge of the high-voltage battery 3 is also referred to as the SOC value.

A step 2001 following the step 2000 determines whether or not the SOC value is greater than a first threshold value SOCthL, that is, whether or not the amount of electric power remaining in the high-voltage battery 3 is greater than a first reference value. When the SOC value is greater than the first threshold value SOCthL, that is, when the amount of electric power remaining in the high-voltage battery 3 is greater than the first reference value, the program advances from the step 2001 to a step 2002. Otherwise, the program advances from the step 2001 to the step 1012.

The step 2002 determines whether or not the SOC value is smaller than a second threshold value SOCthH, that is, whether or not the amount of electric power remaining in the high-voltage battery 3 is smaller than a second reference value. The second threshold value (the second reference value) SOCthH is greater than the first threshold value (the first reference value) SOCthL. When the SOC value is smaller than the second threshold value SOCthH, that is, when the amount of electric power remaining in the high-voltage battery 3 is smaller than the second reference value, the program advances from the step 2002 to the step 1028. Otherwise, the program advances from the step 2002 to a step 2003.

The step 2003 accesses the electric generator/motor 1 (see FIG. 1) via the electric generator/motor controller 14 (see FIG. 1). The step 2003 reduces the electric power generated by the electric generator/motor 1. The reduction in the generated electric power causes a decrease in the SOC value. After the step 2003, the program advances to the step 1028.

It is possible to prevent the power storage portion from being excessively charged or discharged (over-charged or over-discharged).

What is claimed is:

1. An engine-drive-regulation supporting apparatus mounted on a hybrid-drive vehicle which can be driven by an engine and an electric generator/motor, the apparatus comprising:
    engine-drive-regulated region detecting means including at least one of means for judging whether the position of the hybrid-drive vehicle is in a prescribed engine-drive-regulated region on the basis of information received from a vehicle position detecting device provided on the hybrid-drive vehicle or from an external source with respect to the hybrid-drive vehicle, and means for receiving an engine-drive-regulation signal from an external source with respect to the hybrid-drive vehicle; and
    engine-drive regulating means for giving a notice to a vehicle driver, suspending the engine, or decelerating the engine to reduce exhaust gas emitted from the hybrid-drive vehicle when it is judged that the position of the hybrid-drive vehicle is in the prescribed engine-drive-regulated region or in response to reception of the engine-drive-regulation signal.

2. An engine-drive-regulation supporting apparatus as recited in claim 1, wherein the engine-drive regulating means includes:
    means for judging whether the hybrid-drive vehicle is in the prescribed engine-drive-regulated region and the present time is in a prescribed engine-drive-regulated time range; and
    means for giving the notice to the vehicle driver, suspending the engine, or decelerating the engine to reduce exhaust gas emitted from the hybrid-drive vehicle when it is judged that the hybrid-drive vehicle is in the prescribed engine-drive-regulated region and the present time is in the prescribed engine-drive-regulated time range.

* * * * *